(12) United States Patent
Ito et al.

(10) Patent No.: US 10,138,531 B2
(45) Date of Patent: Nov. 27, 2018

(54) INDUCTION HARDENING CONTROL SYSTEM

(71) Applicant: NETUREN CO., LTD., Tokyo (JP)

(72) Inventors: Keisuke Ito, Kanagawa (JP); Yue Yang, Indianapolis, IN (US); Fumiaki Ikuta, Kanagawa (JP); Taichi Kitamura, Aichi (JP); Tetsuya Ono, Kanagawa (JP); Ken-ichi Hoshiba, Kanagawa (JP)

(73) Assignee: NETUREN CO., LTD., Tokyo (JP)

( * ) Notice: Subject to any disclaimer, the term of this patent is extended or adjusted under 35 U.S.C. 154(b) by 413 days.

(21) Appl. No.: 14/491,353

(22) Filed: Sep. 19, 2014

(65) Prior Publication Data
US 2015/0034628 A1 Feb. 5, 2015

Related U.S. Application Data

(62) Division of application No. 13/256,120, filed as application No. PCT/JP2009/054817 on Mar. 12, 2009, now abandoned.

(51) Int. Cl.
*H05B 6/10* (2006.01)
*C21D 11/00* (2006.01)
(Continued)

(52) U.S. Cl.
CPC ............... *C21D 11/00* (2013.01); *C21D 1/10* (2013.01); *H05B 6/06* (2013.01); *C21D 1/42* (2013.01); *Y02P 10/253* (2015.11)

(58) Field of Classification Search
CPC . C21D 1/10; C21D 1/42; C21D 11/00; H05B 6/06; H05B 6/10; H05B 6/101;
(Continued)

(56) References Cited

U.S. PATENT DOCUMENTS 5,630,957 A 5/1997 Adkins et al.
6,965,098 B2 11/2005 Bartz
(Continued)

FOREIGN PATENT DOCUMENTS

CN 1514027 A 7/2004
EP 1 670 289 A1 6/2006
(Continued)

OTHER PUBLICATIONS

International Search Report of PCT/JP2009/054817, dated Jun. 16, 2009.
(Continued)

*Primary Examiner* — Dana Ross
*Assistant Examiner* — Brandon Harvey
(74) *Attorney, Agent, or Firm* — Westerman, Hattori, Daniels & Adrian, LLP

(57) ABSTRACT

An induction apparatus including a hardening control unit for controlling an induction hardening apparatus based on setup conditions data; a hardening monitoring unit that measures, as measurement data, the electric quantity in an electric circuit and that monitors an induction hardening status; and a data collecting unit that collects the data from various sensors in the induction hardening apparatus obtained when the induction hardening apparatus subjects the work to an induction hardening based on the setup conditions data outputted from the hardening control unit and that collects the measurement data from the hardening monitoring unit to store the collected data from the various sensors and the measurement data so that the collected data are associated to each other.

13 Claims, 29 Drawing Sheets

(51) Int. Cl.
*C21D 1/10* (2006.01)
*H05B 6/06* (2006.01)
*C21D 1/42* (2006.01)

(58) Field of Classification Search
CPC ........ H05B 6/102; H05B 6/103; H05B 6/104; Y02P 10/253
USPC .................... 219/608, 665–667, 670, 672
See application file for complete search history.

(56) References Cited

U.S. PATENT DOCUMENTS

| | | |
|---|---|---|
| 7,015,439 B1 | 3/2006 | Thomas et al. |
| 2006/0102620 A1 | 5/2006 | Frankfurt |
| 2006/0290295 A1 | 12/2006 | Yang et al. |

FOREIGN PATENT DOCUMENTS

| | | |
|---|---|---|
| JP | 09-260049 A | 10/1997 |
| JP | 2000-150126 A | 5/2000 |
| JP | 2002-151246 A | 5/2002 |
| JP | 2002-317224 A | 10/2002 |
| JP | 2002-538587 A | 11/2002 |
| JP | 2003-231923 A | 8/2003 |
| JP | 2005-054246 A | 3/2005 |
| JP | 2007-014145 A | 1/2007 |
| JP | 2008-081798 A | 4/2008 |
| JP | 2008-285702 A | 11/2008 |
| JP | 2009-001888 A | 1/2009 |
| WO | 00/51410 A2 | 9/2000 |

OTHER PUBLICATIONS

Japanese Office Action dated Feb. 12, 2013, issued in corresponding Japanese Patent Application No. 2011-503619.
Chinese Office Action dated Dec. 5, 2012, issued in corresponding Chinese Patent Application No. 200980158059.0.
Chinese Office Action dated Jun. 20, 2013, issued in corresponding Chinese Patent Application No. 200980158059.0.
Korean Office Action dated May 15, 2013, issued in Korean Patent Application No. 10-2011-7023956.
European Search Report dated May 22, 2013, issued in corresponding European Patent Application No. 09841479.0.
European Office Action dated Jun. 4, 2013, issued in corresponding European Patent Application No. 09841479.0.

INDUCTION HARDENING CONTROL SYSTEM

CROSS-REFERENCE TO RELATED APPLICATIONS

This is a divisional application of U.S. patent application Ser. No. 13/256,120, filed on Dec. 14, 2011, which is a 371 of International Application No. PCT/JP2009/054817, filed on Mar. 12, 2009, the entire contents of which are incorporated herein by reference.

The present invention relates to an induction hardening control system ensuring whether an induction hardening to a work is performed in accordance with pre-determined setup conditions.

BACKGROUND ART

In order to improve the property of a work such as hardness, the work is subjected to a hardening processing by high-frequency power. FIG. 29 is an appearance diagram schematically illustrating a general hardening processing. For example, a work 50 to be heated is configured, as shown, to have an extension portion 52 at a bar-like base portion 51 in a coaxial manner. Thus, the bar-like base portion 51 and the extension portion 52 form a substantially L-like cross section. A heating coil 61 is a saddle-type coil. The heating coil 61 is adapted to connect both ends of a semicircular portion 61a with a pair of straight portions 61b, 61b. In order to perform a hardening processing, a retention means which is not shown is firstly allowed to retain the work 50. Then, the heating coil 61 is placed over the work 50 so that the semicircular portion 61a of the heating coil 61 is positioned at the upper face-side of the extension portion 52 and the straight portion 61b of the heating coil 61 is positioned to be parallel with a bar-like base portion 51. In this arrangement, whether the distance between the heating coil 61 and the extension portion 52 is within a predetermined range or not is confirmed. Thereafter, while the work 50 is being rotated, high-frequency power is inputted from a high-frequency inverter 62 to the heating coil 61, thereby subjecting the work to a hardening processing. The reference numeral 63 in the drawing denotes a matching capacitor constituting a parallel resonance circuit with the heating coil 61.

A known induction hardening apparatus used in a hardening processing has an equivalent circuit configuration in which output terminals of a high-frequency inverter have therebetween a matching capacitor and a heating coil that are connected in parallel. In order to assure the hardening quality, it is ideal that the effective power (kW) inputted to the heating coil is preferably actually measured for the control based on this effective power as a reference. The equivalent circuit of a heating coil is represented by a serial connection of inductance and resistance. Furthermore, the work heated by the heating coil functions as a resistance load. A method of monitoring the effective power is a method to measure the phase difference between the voltage (Vcoil) generated at both ends of the heating coil and the coil current (Icoil) flowing in the heating coil to calculate the effective power based on the formula Pkw=cos ΦVcoilIcoil. In the formula, cos Φ represents a power factor (Φ represents a power factor angle).

However, in the case of an induction hardening, many loads have a low power factor and the phase difference between the coil voltage and the coil current as a measurement target is high. Specifically, a parallel circuit of a capacitor and a heating coil has Q of about 10. The power factor may be assumed as a reciprocal number of Q. When Q is 10, the power factor is 0.1 and the power factor angle φ is 84 degrees. Thus, the resultant effective power is small that is calculated by measuring Vcoil and Icoil to integrate these values by an arithmetic circuit. Since this arithmetic circuit is easily influenced by the temperature drift and the fluctuation of a frequency and a phase difference, the current situation is that the effective power of the induction hardening processing cannot be accurately monitored based on the calculation value by the arithmetic circuit.

Patent Document 1: Japanese Published Unexamined Patent Application No. 2002-317224
Patent Document 2: Japanese Published Unexamined Patent Application No. 2000-150126
Patent Document 3: Japanese Published Unexamined Patent Application No. 2003-231923

DISCLOSURE OF INVENTION

Problems to be Solved by the Invention

In view of the above, when an output control is performed so as to provide a constant output voltage from a high-frequency oscillator, a conventional method has been considered to detect the current of a heating coil to calculate an average current for power monitoring (e.g., Patent Document 1). However, the coil current, to be exact, has an inductance component of the coil and a resistance component. Thus, even when the load fluctuates, the coil current has a small fluctuation, thus causing a low sensitivity. This consequently prevents an effective power monitoring.

Another conventional method has been considered to perform the monitoring by detecting an output voltage and output current from the high-frequency inverter or by detecting the output power (e.g., Patent Documents 2 and 3). This detection of the output power includes the detection of an output voltage and output current to multiply the effective values thereof. However, this method is to monitor the output power from the high-frequency inverter, i.e., effective power inputted to the load when seen from between the output terminals of the high-frequency inverter. Thus, this method is influenced by the loss in a matching circuit and the power transmission loss. This method cannot sensitively detect the load fluctuation and has a low sensitivity. When a distance from the high-frequency inverter to the heating coil is long in particular, the power transmission loss causes a decreased sensitivity at which the load fluctuation is detected.

On the other hand, when the positional relation between the work as a hardening target and the heating coil deviates from a predetermined range, another disadvantage is caused, that is, the load fluctuation generates to prevent an appropriate hardening processing. This will be described specifically below. In the hardening processing shown in FIG. 29, the work 50 does not always have an identical size and has a size within a certain allowable range. Thus, there is a possibility where the positional relation between the work 50 and the heating coil 61 may be different depending on every work. In spite of this, an appropriate hardening processing is not assured even when the same high-frequency power is inputted regardless of the work 50. Specifically, as to the positional relation between the work 50 and the heating coil 61, when the gap between the work 50 and the heating coil 61 increases, that is, when the distance between the upper face 53 of the extension portion 52 and the semicircular portion 61a of the heating coil 61 increases, it is hard to input a high frequency wave to the work 50. This causes a current situation where every work cannot have an assured hardening processing quality.

The quality control of induction hardening processing for each work is altered not only by the circuit between high-frequency inverter and heating coil but also by concentration or temperature of hardening liquid. Further, it is impossible to check if hardening is processed in accordance with the predetermined setup conditions for each work.

In view of the above problems, it is an objective of the present invention to provide an induction hardening control system ensuring whether an induction hardening to a work is processed in accordance with the setup conditions.

Means for Solving the Problems

In order to achieve the above objective, the present invention provides an induction hardening control system that is connected to an induction hardening apparatus configured so that a high-frequency inverter is connected to a capacitor and a heating coil and that controls an induction hardening to a work placed in the vicinity of a heating coil. The system includes: a hardening control unit that controls the induction hardening apparatus based on setup conditions data regarding the induction hardening apparatus; a hardening monitoring unit that measures, as measurement data, an electric quantity in an electric circuit configured to include a high-frequency inverter, a capacitor, and a heating coil to monitor an induction hardening status; and a data collecting unit that collects data from various sensors in the induction hardening apparatus obtained when the work is subjected to the induction hardening by the induction hardening apparatus based on the setup conditions data outputted from the hardening control unit and that collects the measurement data from the hardening monitoring unit to store the collected data from the various sensors and the measurement data so that the collected data from the various sensors and the measurement data are associated to each other.

In the above configuration, the measurement data preferably includes output current from the high-frequency inverter and a voltage generated in the heating coil.

In the above configuration, the measurement data may include a load impedance calculated based on the output current from the high-frequency inverter and the voltage generated in the heating coil.

In the above configuration, the hardening monitoring unit preferably calculates an effective value based on the output current from the high-frequency inverter and calculates an effective value based on the voltage generated in the heating coil to thereby monitor an induction hardening processing based on the respective calculated effective values.

In the above configuration, the hardening monitoring unit may calculate the effective value based on the output current from the high-frequency inverter and may calculate the effective value based on the voltage generated in the heating coil to thereby calculate the load impedance based on the respective calculated effective values.

In the above configuration, the hardening monitoring unit and the hardening control unit are preferably mutually connected via a communication means.

In the above configuration, the data collecting unit is preferably connected to the hardening monitoring unit and/or the hardening control unit via the communication means.

Effects of the Invention

According to the present invention, the high-frequency inverter is output-controlled by the hardening control unit based on the setup conditions data. During this, the hardening monitoring unit measures the electric quantity in the electric circuit composed of the high-frequency inverter, the capacitor, and the heating coil. The data collecting unit collects the data from various sensors in the induction hardening apparatus obtained by the induction hardening of the work by the induction hardening apparatus based on the setup conditions data outputted from the hardening control unit and the measurement data by the hardening monitoring unit. Thus, by comparing these pieces of collected data with induction hardening conditions to the respective works, whether the induction hardening is performed appropriately or not can be confirmed easily.

BRIEF DESCRIPTION OF DRAWINGS

FIG. 6(A) is an equivalent circuit diagram of a modeled induction heating. FIG. 6(B) is an equivalent circuit diagram when no work exists. FIG. 6(C) is a diagram illustrating an equivalent circuit of FIG. 4(B) with a parallel circuit.

FIG. 8(A) shows a signal waveform corresponding to the voltage in the heating coil. FIG. 8(B) shows a signal waveform corresponding to the output current from the high-frequency inverter.

FIG. 9(A) shows a signal waveform corresponding to the voltage in the heating coil. FIG. 9(B) shows a signal waveform corresponding to the output current from the high-frequency inverter.

FIG. 10(A) shows a signal waveform corresponding to the voltage in the heating coil. FIG. 10(B) shows a signal waveform corresponding to the output current from the high-frequency inverter.

FIG. 11(A) shows a signal waveform corresponding to the voltage in the heating coil. FIG. 11(B) shows a signal waveform corresponding to the current of the primary-side of the current transformer shown in FIG. 3.

FIG. 12(A) shows a signal waveform corresponding to the voltage in the heating coil. FIG. 12(B) shows a signal waveform corresponding to the current of the primary-side of the current transformer shown in FIG. 3.

FIG. 18(A) is a diagram showing a waveform of the load impedance. FIG. 18(B) is a diagram showing a waveform of the output current.

FIG. 19(A) is a diagram showing a waveform of the load impedance. FIG. 19(B) is a diagram showing a waveform of the output current.

FIG. 24(A) is a diagram showing the waveform of the coil voltage. FIG. 24(B) is a diagram showing the waveform of the output current.

FIG. 25(A) is a diagram showing the waveform of the coil voltage. FIG. 25(B) is a diagram showing the waveform of the output current.

EXPLANATION OF REFERENCE NUMERALS

Figure 1:
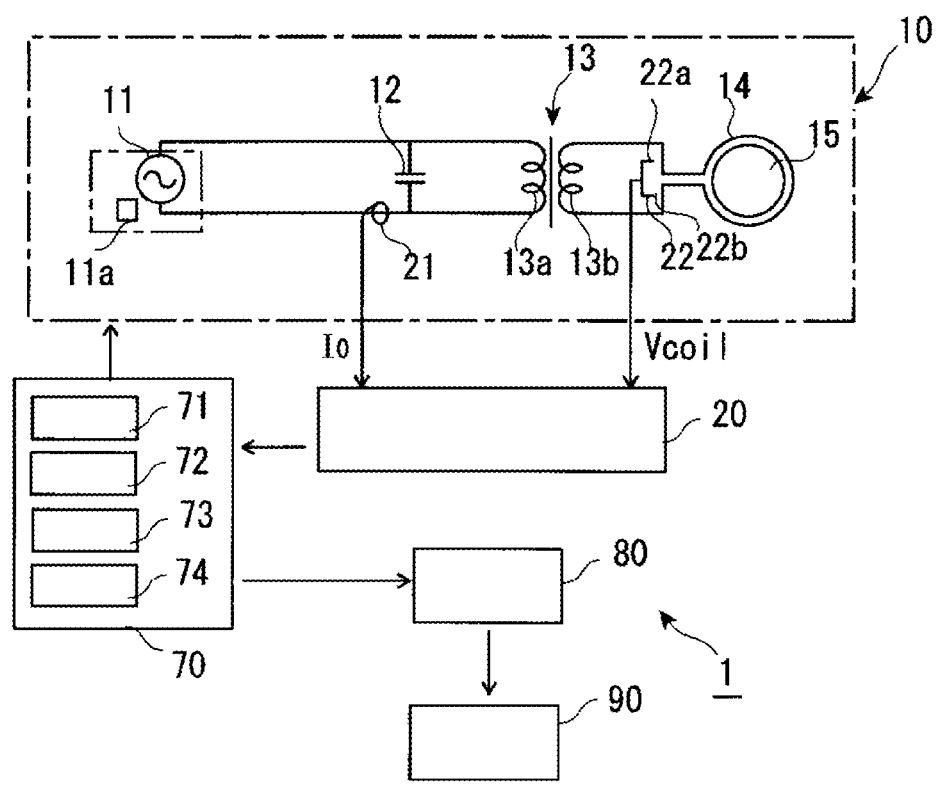
FIG. 1 is a configuration diagram of an induction hardening control system according to the first embodiment of the present invention.

1, 2, 3, and 4: Induction hardening control system
3A, 3B, and 3C: Induction hardening system
10, and 10A: Induction hardening apparatus
11: High-frequency inverter
11a: Sensor
12: Matching capacitor
13, 13A, and 13b: Current transformer
13a: Primary current-side coil
13b: Secondary current-side coil
14, 14A, 14B, and 61: Heating coil
15, 15A, and 15B Work (to-be-heated object)
16, 16a, 16b: Switcher
20: Hardening monitoring unit
21: Current sensor
22, 22A, 22B: Voltage sensor
22a, 22b, 22c, and 22d: End portion of voltage sensor
23: Control unit
23a: Current detection unit
23b: Voltage detection unit
23c: Signal processing unit
23d: Determination unit
23e: Display unit
24: Warning unit
30: Voltage measurement circuit
31: First operational amplifier
32: Second operational amplifier
33: Filter circuit
34: Input resistance
35: First diode
36: Second diode
37, 38, 39, 40, and 41: Resistance
42: Capacitor
50: Work
51: Bar-like base portion
52: Extension portion
53: Upper face
61a: Semicircular portion
61b: Straight portion
70: Hardening control unit
71: Input unit
71: Memory unit
73: Output unit
74: Input and output control unit
80: Data collecting unit
90: Data editing unit
100: First cooling system
101: Coolant tank
102: Flow sensor
102, and 115 Flow sensor
103 and 114: Pump
110: Second cooling system
111: Jacket
112: Retrieving unit
113: Tank 113a: Heating unit
116: Temperature sensor
117: Measuring unit

BEST MODES FOR CARRYING OUT THE INVENTION

The following section will describe some embodiments of the present invention with reference to the attached drawings.

[First Embodiment]

Figure 2:
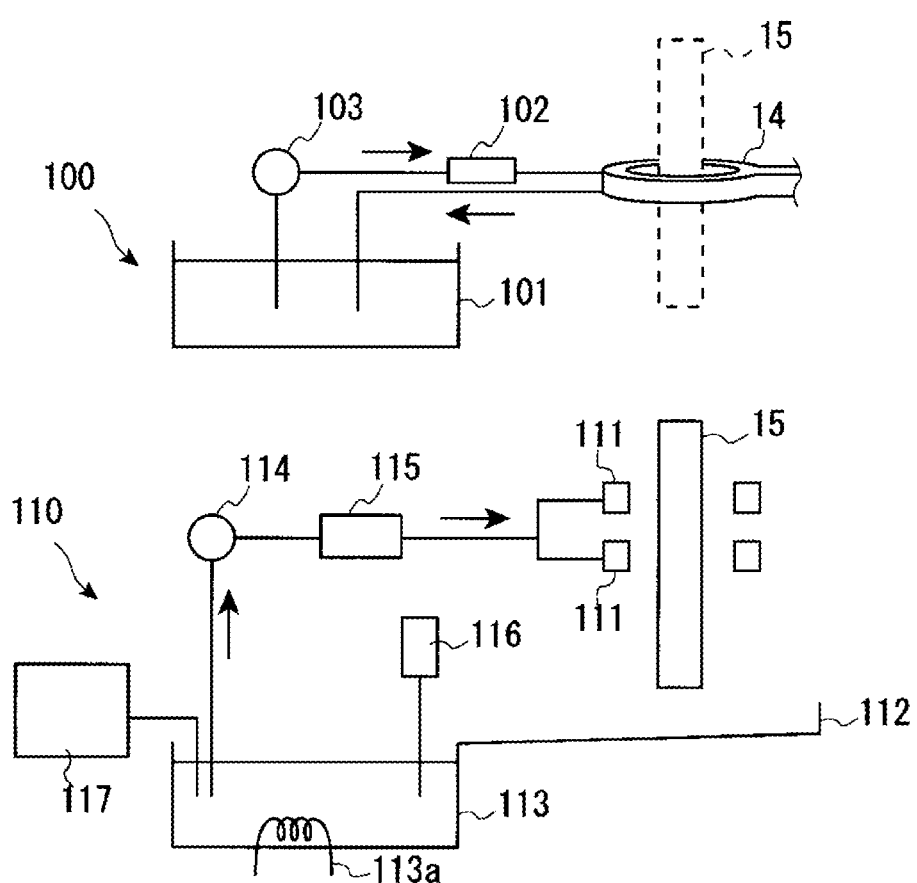
FIG. 2 is a diagram schematically showing a part of an induction hardening monitoring apparatus in the induction hardening control system shown in FIG. 1.
Figure 3:
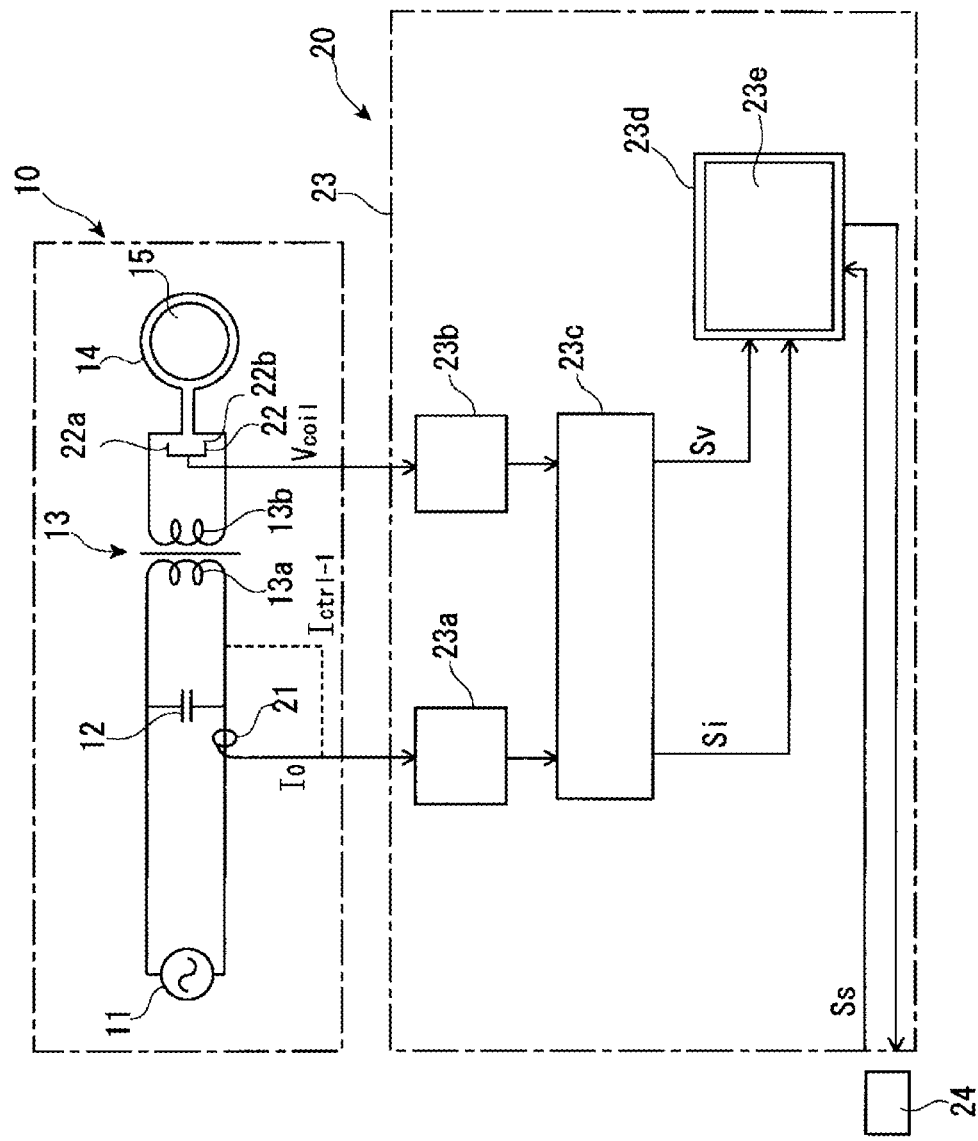
FIG. 3 is a configuration diagram showing an internal configuration of induction hardening monitoring unit, particularly including its detail, in the induction hardening control system shown in FIG. 1.

FIG. 1 is a configuration diagram illustrating an induction hardening control system according to the first embodiment of the present invention. FIG. 2 is a schematic view illustrating a part of an induction hardening apparatus in the induction hardening control system shown in FIG. 1. FIG. 3 is a configuration diagram particularly illustrating the details of the internal configuration of the hardening monitoring unit in the induction hardening control system shown in FIG. 1.

An induction hardening control system 1 includes: an induction hardening apparatus 10 that has a high-frequency inverter 11, a capacitor 12, and a heating coil 14 for example; a hardening control unit 70 that controls the high-frequency inverter based on setup conditions data; a hardening monitoring unit 20 that measures, as measurement data, the electric quantity in an electric circuit in the induction hardening apparatus 10 and that monitors the induction hardening; a data collecting unit 80 that collects data from various sensors in the induction hardening apparatus 10 obtained when the work 15 is subjected to the induction hardening by the induction hardening apparatus 10 based on the setup conditions data outputted from the hardening control unit 70 and that collects the measurement data from the hardening monitoring unit 20 to store the collected data from the various sensors and the measurement data so that the collected data from the various sensors and the measurement data are associated to each other; and a data editing unit 90 that obtains, from the data collecting unit 80, the data from the various sensors and the measurement data to edit these pieces of data. The data collecting unit 80 also may collect the setup conditions data from the hardening control unit 70 so that the setup conditions data is stored as a pair with the above-described data from the various sensors and measurement data.

As shown in FIGS. 1 and 2, the induction hardening apparatus 10 has an electric circuit configuration composed of a high-frequency inverter 11, a matching capacitor 12 connected between the output terminals of the high-frequency inverter 11, especially between output cables, a heating coil 14 for subjecting a work 15 to an induction heating, and a current transformer 13 provided between the matching capacitor 12 and the heating coil 14. Thus, the induction hardening apparatus 10 has an equivalent circuit configuration that includes the matching capacitor 12 and the heating coil 14 including a parallel resonance circuit.

The high-frequency inverter 11 is a current-fed inverter and is controlled so that the output voltage remains constant. The current transformer 13 has a primary coil 13a parallelly connected to the matching capacitor 12 with regard to the high-frequency inverter 11 and a secondary coil 13b parallelly connected to the heating coil 14.

According to the induction hardening apparatus 10, by supplying high-frequency current from the high-frequency inverter 11 to the heating coil 14 while the work 15 is being placed in a receiving unit (not shown) including the heating coil 14, eddy current is caused in the work 15 to thereby heat the work 15 to perform a hardening processing.

The induction hardening apparatus 10 is attached with various sensors. Various sensors include: a sensor 11a as shown in FIG. 1 for monitoring the output time and the output intensity from the high-frequency inverter 11; a sensor (not shown) for detecting the position, the transportation speed, or the rotation speed of the work 15 for example; a flow sensor 115 as shown in FIG. 2 for detecting the flow of the hardening liquid; a temperature sensor 116 as shown in FIG. 2 for detecting the temperature of the hardening liquid; and a measuring unit 117 as shown in FIG. 2 for measuring the cooling power or concentration of the hardening liquid for example. The following section will describe these sensors.

The sensor 11a is included in the high-frequency inverter 11 and detects the output time and the output intensity from the high-frequency inverter 11.

The induction hardening apparatus 10 is attached with a moving means or a rotary means (not shown). The moving means moves the work from a predetermined position relative to the heating coil 14. The rotary means rotates the work relative to the heating coil 14. Thus, the induction hardening apparatus 10 is attached with sensors for sensing whether the work 15 is accurately moved or rotated by the moving means or the rotary means (specifically, a position sensor, a rotation sensor, or a speed sensor for example).

The induction hardening apparatus 10 shown in FIG. 1 includes, as shown in FIG. 2, a first cooling system 100 for causing coolant to flow in the heating coil 14 and the second cooling system 110 for jetting hardening liquid to the work 15 to collect the liquid.

The first cooling system 100 has a configuration as described below for example. The first cooling system 100 is configured, as shown in FIG. 2, so that a coolant tank 101, a pump 103, and the heating coil 14 are connected by a piping. When the work 15 shown by the dotted line is subjected to an induction heating, coolant is caused to flow over the heating coil 14 in the direction shown by the arrow. A flow sensor 102 is attached in the middle of the piping. This flow sensor 102 detects the flow of the coolant.

The second cooling system 110 has a configuration as described below for example. The second cooling system 110 is configured, as shown in FIG. 2, so that a jacket 111 surrounds the work 15 shown by the solid line, a tank 113 stores therein hardening liquid, and a pump 114 pumps up the hardening liquid from the tank 113. The hardening liquid is sent, as shown by the arrow, via the piping to the jacket 111 and is jetted from the jacket 111 toward the work 15 and is returned by a retrieving unit 112 to the tank 113. The tank 113 has a heating unit 113a for controlling the temperature of the hardening liquid. The tank 113 is attached with a temperature sensor 116 for detecting the temperature of the coolant in the tank 113. The piping between the pump 114 and the jacket 111 is attached with the flow sensor 115. The measuring unit 117 is provided to measure the cooling power of the hardening liquid. The measuring unit 117 measures the cooling power of the hardening liquid in the tank 113 at an arbitrary timing or on a real-time basis.

As shown in FIG. 3, the hardening monitoring unit 20 includes: a current sensor 21 for detecting the output current from the high-frequency inverter 11; a voltage sensor 22 for detecting the voltage in the heating coil 14; a controller 23 for monitoring a hardening processing based on the detection signal from the current sensor 21 and the detection signal from the voltage sensor 22; and the warning unit 24 for inputting various pieces of control information to the controller 23 and for receiving a warning signal from the controller 23.

The current sensor 21 is electrically connected to a wiring of the high-frequency inverter 11 and the matching capacitor 12 and detects the output current $I_o$ of the high-frequency inverter 11. The voltage sensor 22 has both ends including the terminals 22a and 22b that are parallelly connected to the heating coil 14 to detect the voltage $V_{coil}$ of the heating coil 14.

The controller 23 includes: the current detection unit 23a for receiving an input of a detection signal from the current sensor 21; the voltage detection unit 23b for receiving an input of a detection signal from the voltage sensor 22; the signal processing unit 23c for receiving an input from the current detection unit 23a and the voltage detection unit 23b to subject the inputs to a signal processing, respectively; and the determination unit 23d for receiving the input of the signal processing by the signal processing unit 23c to determine whether the result is within a predetermined range or not. The determination unit 23d includes the display unit 23e for outputting the result of the signal processing by the signal processing unit 23c.

The current sensor 21 and the current detection unit 23a may be configured by a current transfer (current transformer) for converting the detected current to a voltage. A Rogowski coil can be used for the current sensor 21. The current detection unit 23a converts the voltage generated in the Rogowski coil to a voltage within a predetermined range. The current transfer converts the output current of 500 $A_{rms}$ to 0.5$V_{rms}$ for example.

The voltage sensor 22 and the voltage detection unit 23b may be configured by a potential transfer (transformer) for converting the detected voltage to a voltage within a predetermined range. In this case, the voltage sensor 22 can use a probe that can be connected between the terminals of the heating coil 14. The voltage detection unit 23b converts the voltage extracted by the probe to a voltage within a predetermined range. The potential transfer converts the coil voltage of 200$V_{rms}$ to 10$V_{rms}$ for example.

The signal processing unit 23c rectifies the signals from the current detection unit 23a and the voltage detection unit 23b respectively to calculate effective values and removes noise by filters to thereby output the current signal $S_i$ and the voltage signal $S_v$ to the determination unit 23d. Thus, the signal from the current transfer e.g., a signal of 0.5$V_{rms}$ is converted to a voltage signal of 5V, while the signal from the potential transfer e.g., a signal of 10$V_{rms}$ is converted to a voltage signal of 5V.

Further, in response to a request from the data collecting unit 80 as mentioned below, the signal processing unit 23c transmits the calculated effective values, namely current signal $S_i$ and voltage signal $S_v$, to the data collecting unit 80.

The determination unit 23d determines whether the current signal $S_i$ and the voltage signal $S_v$ inputted from the signal processing unit 23c are appropriate or not. That is, by receiving the heating synchronization signal $S_s$ from a controller (not shown) for controlling the high-frequency inverter 11, the determination unit 23d extracts the waveforms of the current signal $S_i$ and the voltage signal $S_v$. Then, the determination unit 23d displays the waveforms on the display unit 23e together. In this case, the determination unit 23d displays upper-limit and lower-limit threshold values that are set in advance. This allows the determination unit 23d to determine, when the current signal $S_i$ and the voltage signal $S_v$ are higher than the upper-limit threshold value or lower than the lower-limit threshold value during the operation of the induction hardening apparatus 10, that the determination is not fine to thereby record the waveform as an abnormal waveform. The determination unit 23d outputs a warning signal to the warning unit 24. The output of a warning signal may be performed by performing a warning display of "Not Fine" on the display unit 23e.

The warning unit 24 performs a warning display based on the warning signal from the determination unit 23d, generates warning sound to the outside, or instructs a controller (not shown) of the high-frequency inverter 11 to stop the output of high-frequency power.

The following section will describe a circuit configuration in the signal processing unit 23c of FIG. 3. The signal processing unit 23c includes a current measurement circuit for processing a signal from the current detection unit 23a and a voltage measurement circuit for processing a signal from the voltage detection unit 23b. The current measurement circuit and the voltage measurement circuit have a similar circuit configuration. Therefore, the voltage measurement circuit will be described below.

Figure 4:
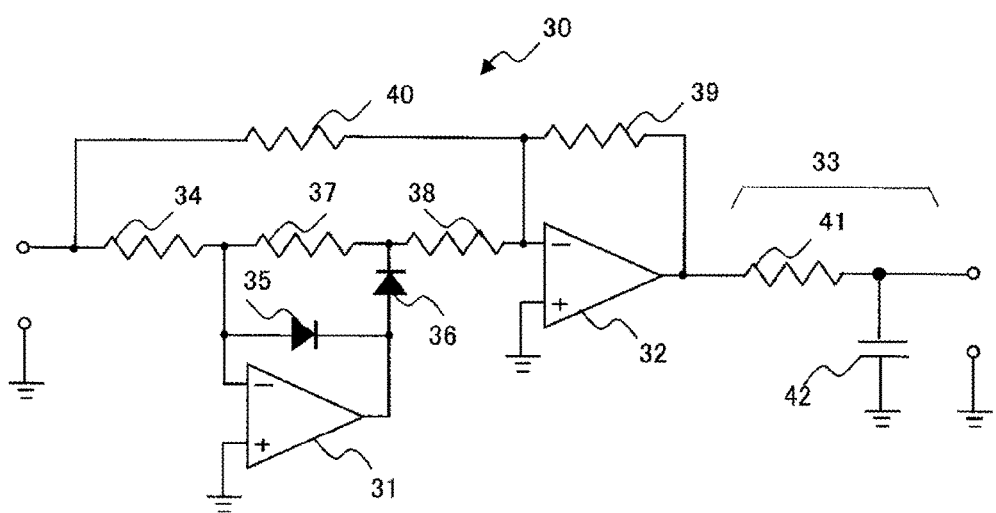
FIG. 4 shows a voltage measurement circuit in a signal processing unit in FIG. 3.

FIG. 4 shows a voltage measurement circuit 30 in a signal processing unit 23c in FIG. 3. The voltage measurement circuit 30 is structured so that the first operational amplifier 31 and the second operational amplifier 32 are cascade-connected and the output-side is connected to a filter circuit 33. The first operational amplifier 31 is connected to input resistance 34, a first diode 35 connected to an input terminal and an output terminal, a second diode 36 having one end connected to an output terminal, and resistance 37 having one end connected to an input terminal and the other end connected to the other end of the second diode 36. This first operational amplifier 31 is a so-called ideal diode and performs a half-wave rectification of an input signal voltage. The first operational amplifier 31 and the second operational amplifier 32 are connected by resistance 38. The second operational amplifier 32 is an inverting amplifier in which resistance 39 is connected between an input terminal and an output terminal. The second operational amplifier 32 has an input terminal connected to the input signal-side of the input resistance 34 via resistance 40. The output from the second operational amplifier 32 is a waveform obtained by subjecting the input voltage signal to a full wave rectification. This full wave rectification waveform is inputted to the low pass-type filter circuit 33 composed of the resistance 41 and a capacitor 42. Then, the ripple of the full wave rectification waveform is removed and the full wave rectification waveform is converted to a DC voltage. By setting the value of the resistance 41 and the capacitor 42 of the filter circuit 33, the effective value of the wave by the full wave rectification outputted from the second operational amplifier 32 is obtained.

The following section will describe in detail the relation among the hardening control unit 70, the data collecting unit 80 and the hardening monitoring unit 20 shown in FIG. 1. The hardening control unit 70, the hardening monitoring unit 20, and the data collecting unit 80 are mutually connected by a communication means (not shown). The communication means includes, for example, wired communication by a LAN cable or an RS232C cable and wireless communication such as wireless LAN. Data communication by wired communication or wireless communication may be provided by parallel transmission or serial transmission. The hardening control unit 70 and the high-frequency inverter 11 also may be connected by these communication means.

As shown in FIG. 1, the hardening control unit 70 includes: an input unit 71 for inputting input information such as setup conditions data; a memory unit 72 for storing setup conditions data inputted from the input unit 71; an output unit 73 for outputting setup conditions data; and an input and output control unit 74 for subjecting the setup conditions data to an input/output control. The setup conditions data is data for setting the output intensity and the output time from the high-frequency inverter 11 in the induction hardening apparatus 10 and includes, for example, output current, an output voltage, an output power, and an output time. This setup conditions data also may include control data for controlling the positional relation between the work 15 and the heating coil 14 (e.g., control data of the moving means or the rotary means of the work 15, control data of the pump 103 in the first cooling system 100 or the pump 114 in the second cooling system 110).

When measurement data is sent from the hardening monitoring unit 20 to the hardening control unit 70 or when the hardening control unit 70 causes the output unit 73 to output setup conditions data to the high-frequency inverter 11 and measurement data is sent to the hardening control unit 70 upon a transmission request of then measurement data to the hardening monitoring unit 20, the measurement data generated by the hardening monitoring unit 20 is stored in the memory unit 72 of the hardening control unit 70 while being combined with the setup conditions data.

When the induction hardening apparatus 10 subjects a work to an induction hardening based on the setup conditions data outputted from the hardening control unit 70, the data collecting unit 80 receives data detected by various sensors in the induction hardening apparatus (e.g., the sensor 11a, a detection sensor (not shown) for detecting the position of the work 15, the carry-in speed, or the rotation speed for example, the flow sensor 102 in the first cooling system 100, the flow sensor 115 in the second cooling system 110, the temperature sensor 116, the measuring unit 117) and stores the data. The data collecting unit 80 collects these pieces of detection data from the induction hardening apparatus 10, setup conditions data for each work from the hardening control unit 70, and measurement data generated by the hardening monitoring unit 20 for each induction hardening processing and stores the data in an internal memory unit (not shown).

The data editing unit 90 is configured by a general-purpose computer for example. The data editing unit 90 reads setup conditions data and measurement data for each work from the data collecting unit 80 via a wired or wireless LAN to store the data. The data editing unit 90 stores therein spreadsheet software for example as a tool. The data editing unit 90 reads the detection data from the induction hardening apparatus 10 and the setup conditions data and the measurement data for each work to determine the induction hardening quality for each work to allow a user to input the determination result. The data communication between the data collecting unit 80 and the data editing unit 90 may be realized by the data transmission, for example by the RS232C, or by storing the data in the data collecting unit 80 to a separately-prepared recording medium (e.g., USB memory) to insert the recording medium to the data editing unit 90 to copy the data for example.

If the hardening control unit 70 is configured in a different manner from the above-described one so that the detection data from the induction hardening apparatus 10 and the setup conditions data and measurement data are stored while having no association among them at all, setup conditions data and measurement data are acquired from the hardening control unit 70 based on a processing number attached to each work or an induction hardening processing date for example. Then, the setup conditions data and measurement data are associated with the detection data outputted from the induction hardening apparatus 10 based on association data such as an induction hardening processing time so that the detection data as well as the setup conditions data and measurement data can be stored as a combination.

The following section will describe a hardening monitoring by the induction hardening control system 1 shown in FIG. 1.

The hardening control unit 70 outputs setup conditions to the induction hardening system 10. Accordingly, in the induction hardening apparatus 10, the high-frequency inverter 11 inputs high-frequency power to the heating coil 14 via the matching capacitor 12 and the current transformer 13 based on the input setup conditions. Moving means in the induction hardening apparatus 10 moves the work 15 and rotary means in the induction hardening apparatus 10 rotates the work 15. As a result, the work 15 placed in the heating coil 14 is heated and is subjected to an induction hardening. Then, in the induction hardening monitoring apparatus 20, the current sensor 21 detects the output current $I_o$ from the high-frequency inverter 11 and the voltage sensor 22 detects the voltage $V_{coil}$ of the heating coil 14. The sensor detects a location, import speed, and rotation speed of the work 15. The flow sensor 102 in the first cooling system 100 detects flow of coolant. The temperature sensor 116 and the flow sensor 115 in the second cooling system 110 detect temperature and flow of hardening liquid. These detected data are output to the hardening control unit 70 or data collecting unit 80 as the detected data from the induction hardening system 10.

The current detection unit 23a and the voltage detection unit 23b of the controller 23 adjusts the levels of the respective detection signals from the current sensor 21 and the voltage sensor 22 respectively and outputs the current signal $S_i$ and the voltage signal $S_v$ to the signal processing unit 23c. Then, the signal processing unit 23c rectifies the current signal and the voltage signal inputted from the current detection unit 23a and the voltage detection unit 23b respectively to calculate effective values and outputs the effective values as the current signal $S_i$ and the voltage signal $S_v$ to the determination unit 23d.

The determination unit 23d synchronizes the current signal $S_i$ and the voltage signal $S_v$ from the signal processing unit 23c based on the heating synchronization signal $S_s$ to determine the waveforms. Then, the determination unit 23d compares the current signal $S_i$ and the voltage signal $S_v$ with the upper-limit and lower-limit threshold values to determine whether the current signal $S_i$ and the voltage signal $S_v$ are higher than the upper-limit threshold value or not and/or whether the current signal $S_i$ and the voltage signal $S_v$ are lower than the lower-limit threshold value or not. When the current signal $S_i$ and the voltage signal $S_v$ deviate from the threshold value, the determination unit 23d records the waveform and outputs a warning signal to the warning unit 24.

Upon receiving the warning signal, the warning unit 24 displays a warning and/or generates warning sound. Thus, upon recognizing the warning display or the warning sound, a worker performing a hardening can notice that abnormality is caused in the induction hardening. The warning unit 24 may stop the output operation of the high-frequency inverter 11 of the induction hardening apparatus 10.

As described above, the current sensor 21 is used to detect the output current from the high-frequency inverter 11. The voltage sensor 22 is used to detect the voltage generated in the heating coil 14. Based on the detection signal from the current sensor 21 and the detection signal from the voltage sensor 22, a hardening processing is monitored. As a result, when high-frequency power is inputted to the heating coil 14 via the capacitor 12 from the high-frequency inverter 11 for which the output is controlled so that the output power is constant, the fluctuation of the output power from the high-frequency inverter 11 has a direct influence on the output current. Thus, by monitoring this output current by the current sensor 21, the output power from the high-frequency inverter 11 can be monitored during the induction hardening processing. On the other hand, by using the voltage sensor 22 to monitor the voltage generated in the heating coil 14, an increased detection sensitivity is obtained by the transmission loss from the high-frequency inverter 11 to the heating coil 14 and/or the matching loss by the parallel resonance circuit of the capacitor 12 and the heating coil 14. Thus, the fluctuation of the voltage of the heating coil 14 can be detected accurately.

Figure 5A:
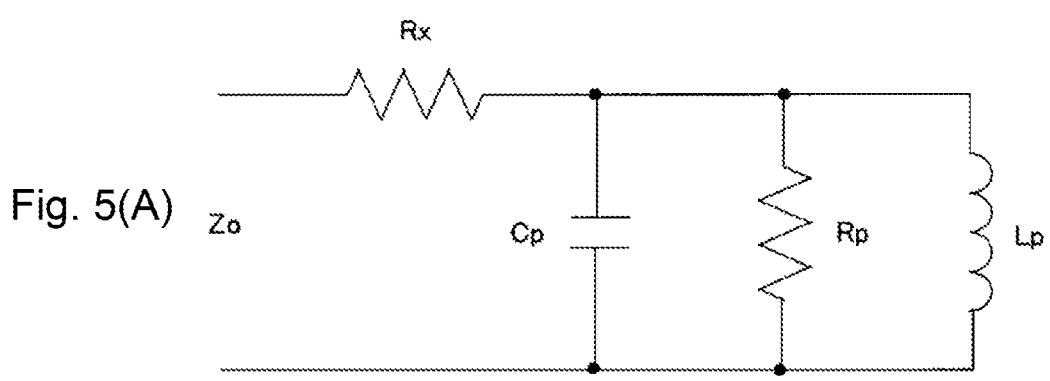
FIG. 5(A) shows a load resonance circuit.
Figure 5B:
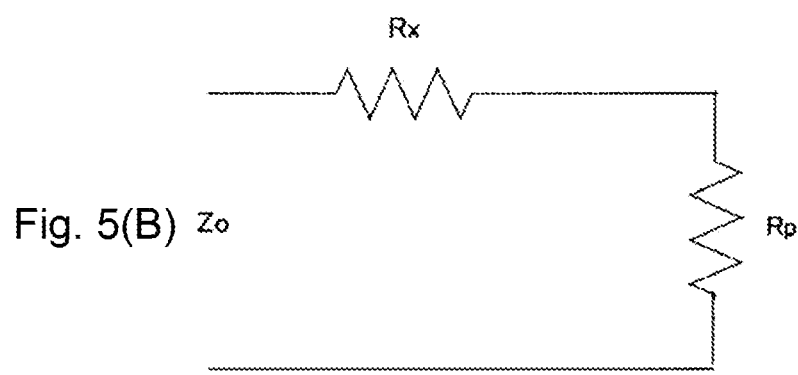
FIG. 5(B) is an equivalent circuit diagram of the load resonance circuit shown in FIG. 5(A) when the frequency of the high-frequency inverter is synchronized with the resonance frequency of the load resonance circuit.

That is, when the power transmission loss is small, the fluctuation rate of the output current due to a load fluctuation is higher than the fluctuation rate of the coil voltage. Thus, it is effective to monitor the output current from the high-frequency inverter 11 by the current sensor 21. When the power transmission loss is large on the other hand, the fluctuation rate of the coil voltage due to the load fluctuation is higher than the fluctuation rate of the output current from the high-frequency inverter 11. Thus, it is effective to monitor the coil voltage by the voltage sensor 22. On the contrary, when the output power is controlled so that the high-frequency inverter has a constant output voltage in the method described in the background art of monitoring the output current and the output voltage of the high-frequency inverter, the load fluctuation cannot be detected FIG. 5(A) shows a load resonance circuit. FIG. 5(B) is a diagram showing an equivalent circuit when the frequency of the high-frequency is synchronized with the resonance frequency of the load resonance circuit with regard to the load resonance circuit shown in FIG. 5(A). The induction heating electric circuit shown in FIG. 3 is represented, as shown in FIG. 5(A), by a circuit in which the parallel connection of the matching capacitor $C_p$, the load resistance $R_p$, and the load inductance $L_p$ is serially connected to the resistance $R_x$ including the transmission loss between the high-frequency inverter and the heating coil and the matching loss. When the frequency of the high-frequency inverter is synchronized with the frequency of the load resonance circuit in the load resonance circuit shown in FIG. 5(A), the circuit shown in FIG. 5(A) can be rewritten to the equivalent circuit shown in FIG. 5(B), i.e., a non-inductive resistance circuit. It is assumed that the resistance including the matching loss and the transmission loss between the high-frequency inverter and the heating coil is $R_x$, the load resistance is $R_p$, the output voltage from the high-frequency inverter is $V_o$=300V, and the output $I_o$=300 A. It is assumed that $R_x$ and $R_p$ are both 0.5Ω and the description will not be further provided. When the load fluctuation causes a change of the resistance $R_p$ from 0.5Ω to 0.55Ω by +10%, the output voltage controlled to be constant causes the output voltage $V_o$ to be unchanged at 300V and causes the output current L to be changed from 300 A to 285.7 A. Thus, the change rate of the output current is also −4.8% and the output power changes by −4.8%. Then, the coil voltage $V_{coil}$ changes from 150V (=300 A×0.5Ω) to 157.1V (=285.7 A×0.55Ω), causing a decreasing rate of the coil voltage of +4.8%. That is, the decreasing rate of the output current from the high-frequency inverter is substantially equal to the increase rate of the coil voltage.

When the resistance $R_x$ including the transmission loss and the matching loss is 0.4Ω and the load resistance $R_p$ is 0.6Ω in the above circuit configuration, a case will be considered where the change rate of the load resistance $R_p$ is +10%, i.e., the load resistance $R_p$ changes from 0.6Ω to 0.66Ω. In this case, the output voltage $V_o$ of the high-frequency inverter is unchanged at 300V and the output current $I_o$ changes from 300 A to 283.0 A. Thus, the change rate of the output current is also −5.7% and the output power changes by −5.7%. Then, the coil voltage $V_{coil}$ changes from 180V (=300 A×0.6Ω) to 186.8V (=283.0 A×0.66Ω) and the change rate of the coil voltage is about +3.8%. That is, the decrease rate of the output current from the high-frequency inverter has an absolute value that is higher than the absolute value of the increase rate of the coil voltage.

When a case is considered where the resistance $R_x$ including the transmission loss and the matching loss is 0.6Ω and the load resistance $R_p$ is 0.4Ω in the circuit configuration, the change rate of the load resistance $R_p$ is +10%, i.e., the load resistance $R_p$ changes from 0.4Ω to 0.44Ω. In this case, the output voltage $V_o$ of the high-frequency inverter is unchanged at 300V and the output current $I_o$ changes from 300 A to 288.5 A. Thus, the change rate of the output current is also −3.8% and the output power also changes by −3.8%. Then, the coil voltage $V_{coil}$ changes from 120V (=300 A×0.4Ω) to 126.9V (=288.5 A×0.44Ω) and the change rate of the coil voltage is about +5.7%. That is, the decrease rate of the output current from the high-frequency inverter has an absolute value that is lower than the absolute value of the increase rate of the coil voltage.

From the above, it can be seen that, in the case of the conventional method to monitor the output current and the output voltage of a high-frequency inverter, with an increase of the transmission loss and the matching loss, e.g., with an increase of the ratio between the resistance $R_x$ including the transmission loss and the matching loss and the load resistance $R_p$ from 0.4:0.6 through 0.5:0.5 to 0.6:0.4, the change rate of the output current L from the high-frequency inverter changes from −5.7% through −4.8% to −3.8% and thus the output current from the high-frequency inverter does not change in proportion with the change rate of the load resistance $R_p$, thus showing a poor sensitivity to the fluctuation of the load resistance $R_p$.

In contrast with this, by monitoring as in this embodiment both of the coil voltage $V_{coil}$ and the output current $I_o$ from the high-frequency inverter, the influence by the transmission loss can be eliminated to monitor the load fluctuation. The reason is that, in the case that the ratio of the transmission loss and the matching loss is small, the fluctuation of the load resistance has a bigger influence on the change rate of the output current than on the fluctuation rate of the coil voltage and thus the monitoring of the change of the output current from the high-frequency inverter is preferred. In the case that the ratio of the transmission loss and the matching loss is large on the contrary, the fluctuation of the load resistance has a bigger influence on the fluctuation rate of the coil voltage than on the change rate of the output current and thus the monitoring of the change of the coil voltage is preferred. That is, by monitoring both of the coil voltage $V_{coil}$ and the output current $I_o$ from the high-frequency inverter, a monitoring method is established to eliminate an influence by the power loss in the circuit.

After the induction hardening processing is performed in the manner as described above, the data collecting unit 80 collects the data regarding the induction hardening processing to a predetermined work. Specifically, the data collecting unit 80 requests the hardening control unit 70 to send the search data (e.g., the processing number, the induction hardening processing date) as well as setup conditions data, measurement data, and detection data. Then, the input and output control unit 74 of the hardening control unit 70 identifies, based on the search data, the setup conditions data, the measurement data, and the detection data from the memory unit 72 to output the data to the data collecting unit 80. In this manner, the data collecting unit 80 collects the setup conditions data, the measurement data, and the detection data.

In addition to this, another configuration also may be used where the data collecting unit 80 requests the hardening control unit 70 to simultaneously send the setup conditions data, the measurement data, and the detection data and the data collecting unit 80 collects the setup conditions data, the measurement data, and the detection data to store, based on association data (e.g., an induction hardening processing date), the setup conditions data, the measurement data, and the detection data in a database so that the association thereamong can be established.

The data collection by the data collecting unit 80 also may be performed, in addition to the communication means as described above, by another configuration in which setup conditions data, measurement data, and detection data stored in the memory unit 72 of the hardening control unit 70 are once stored in a recording medium such as a card or a CD-ROM to subsequently insert the recording medium to the data collecting unit 80.

Another configuration also may be used in which, if detection data is directly inputted from the induction hardening apparatus 10 to the data collecting unit 80, only setup conditions data and measurement data are obtained from the hardening control unit 70.

As described above, the data collecting unit 80 stores the setup conditions data, the measurement data, and the detection data in a database so that the association thereamong can be established. The stored setup conditions data, measurement data, and detection data can be searched and read by inputting information identifying the induction hardening processing by the data collecting unit 80. Thus, setup conditions data regarding a desired induction hardening processing and associated measurement data and detection data can be easily and quickly extracted to thereby perform a control for the induction hardening processing in a secure manner. Furthermore, the setup conditions data, the measurement data, and the detection data stored in the data collecting unit 80 can be stored, as required, in a medium (e.g., a card, CD-ROM) and can be transferred to the data editing unit 90 as shown in FIG. 1 so that a user can confirm the data by the data editing unit 90 through spreadsheet software for example.

[Second Embodiment]

In the hardening unit 20 of the second embodiment, during an induction hardening, the normality of the induction hardening processing is monitored by monitoring load impedance i.e., a value obtained by dividing a heating coil voltage by output current outputted from a high-frequency inverter. An induction hardening control system 1 including a hardening monitoring unit according to the second embodiment has the same configuration as in the case of FIG. 1 showing the first embodiment. Specifically, the induction hardening monitoring apparatus according to the second embodiment, specifically, an induction hardening control system 1 including an impedance monitoring apparatus is composed, as shown in FIG. 1, of an induction hardening apparatus 10, a hardening monitoring unit 20, hardening control unit 70 and a data collecting unit 80.

As shown in FIGS. 1 and 3, the induction hardening apparatus 10 is configured so that a matching capacitor 12 and a heating coil 14 form a parallel resonance circuit in an equivalent circuit-like manner. In the second embodiment, the induction hardening apparatus 10 may be a series resonance circuit composed of a matching capacitor and a heating coil. Although the high-frequency inverter 11 is a current-fed inverter as in the first embodiment, the second embodiment is different from the first embodiment in that the high-frequency inverter 11 is driven while being controlled based on a constant power control method so that an outputted high-frequency power is constant. The second embodiment is the same as the first embodiment in that the current transformer 13 is composed of the primary current-side coil 13a parallelly connected to the matching capacitor 12 with regard to the high-frequency inverter 11 and the secondary current-side coil 13b parallelly connected to the heating coil 14.

According to the induction hardening apparatus 10, by supplying high-frequency current from the high-frequency inverter 11 to the heating coil 14 while the work 15 is being placed in a receiving unit (not shown) including the heating coil 14, eddy current is caused in the work 15 to thereby heat the work 15 to perform a hardening processing. Other configuration is same as FIGS. 1 to 3.

The hardening monitoring unit 20 includes: a current sensor 21 for detecting the output current from the high-frequency inverter 11; a voltage sensor 22 for detecting the voltage in the heating coil 14; a controller 23 for calculating a load impedance based on the detection signal from the current sensor 21 and the detection signal from the voltage sensor 22 to monitor a hardening processing based on this load impedance; and the warning unit 24 for inputting various pieces of control information to the controller 23 and for receiving a warning signal from the controller 23.

The current sensor 21 is electrically connected to a wiring of the high-frequency inverter 11 and the matching capacitor 12 and detects the output current $I_o$ of the high-frequency inverter 11. The voltage sensor 22 has both ends including the terminals 22a and 22b that are parallelly connected to the heating coil 14 to detect the voltage $V_{coil}$ of the heating coil 14.

The controller 23 includes: the current detection unit 23a for receiving an input of a detection signal from the current sensor 21; the voltage detection unit 23b for receiving an input of a detection signal from the voltage sensor 22; the signal processing unit 23c for receiving an input from the current detection unit 23a to calculate an effective value regarding the output current and for receiving an input from the voltage detection unit 23b to calculate an effective value regarding the coil voltage; and the determination unit 23d for calculating a load impedance based on the respective effective values regarding the output current and the coil voltage calculated by the signal processing unit 23c to thereby determine whether the load impedance is within a reference interval or not. The determination unit 23d includes the display unit 23e for outputting the result of the signal processing by the signal processing unit 23c.

The current sensor 21 and the current detection unit 23a may be configured by a current transfer (current transformer) for converting the detected current to a voltage. The voltage sensor 22 and the voltage detection unit 23b may be configured by a potential transfer (transformer) for converting the detected voltage to a voltage within a predetermined range. These points are the same as those of the first embodiment.

The signal processing unit 23c rectifies the signals from the current detection unit 23a and the voltage detection unit 23b respectively to calculate effective values and uses filters to remove noise to thereby output the current signal $S_i$ and the voltage signal $S_v$ to the determination unit 23d. This point is the same as that of the first embodiment. The signal processing unit 23c includes a current measurement circuit for processing the signal from the current detection unit 23a and a voltage measurement circuit for processing the signal from the voltage detection unit 23b, respectively. The current measurement circuit and the voltage measurement circuit have the same specific configurations as those of the first embodiment. Thus, the signal from the current transfer, e.g., a signal of $0.5V_{rms}$, is converted to a voltage signal of 5V while the signal from the potential transfer, e.g., a signal of $10V_{rms}$, is converted to a voltage signal of 5V.

The determination unit 23d divides the coil voltage by the output current based on the current signal $S_i$ and the voltage signal $S_v$ inputted from the signal processing unit 23c to thereby determine whether this calculated load impedance is within a stipulated range or not. In particular, by receiving the heating synchronization signal $S_s$ from a controller (not shown) for controlling the high-frequency inverter 11, the determination unit 23d samples the values of the current signal $S_i$ and the voltage signal $S_v$ inputted from the signal processing unit 23c. Next, the determination unit 23d divides the sampled voltage value by the sampled current value and multiplies the result with a predetermined proportional constant to thereby calculate the value of the output current to the coil voltage, i.e., a load impedance. Then, the calculation result is graphically displayed on the display unit 23e during which whether the calculated load impedance is within the reference interval or not is determined. When the calculated load impedance is within the reference interval, the determination unit 23d determines that the hardening processing is fine. When the calculated load impedance is not within the reference interval, the determination unit 23d determines that the hardening processing is not fine to thereby display a warning signal to the warning unit 24.

The determination unit 23d may be configured so as to be able to output the waveform of any of the current signal $S_i$ and the voltage signal $S_v$ to the display unit 23e upon receiving the heating synchronization signal $S_s$ from a controller (not shown) of the high-frequency inverter 11. In this case, the determination unit 23d displays upper-limit and lower-limit threshold values that are set in advance. This allows the determination unit 23d to determine, when the current signal $S_i$ and the voltage signal $S_v$ are higher than the upper-limit threshold value or lower than the lower-limit threshold value during the operation of the induction hardening apparatus 10, that the determination is not fine to thereby record the waveform as an abnormal waveform.

The determination unit 23d outputs a warning signal to the warning unit 24. The output of a warning signal may be performed by performing a warning display of "Not Fine" on the display unit 23e.

The warning unit 24 performs a warning display based on the warning signal from the determination unit 23d, generates warning sound to the outside, and instructs a controller (not shown) of the high-frequency inverter 11 to stop the output of high-frequency power.

The following section will describe a hardening monitoring when the induction hardening system 1 is used to perform a hardening processing. In the induction hardening apparatus 10, the high-frequency inverter 11 inputs high-frequency power to the heating coil 14 via the matching capacitor 12 and the current transformer 13. As a result, the work 15 placed in the heating coil 14 is heated and is subjected to an induction hardening. Then, in the hardening monitoring unit 20, the current sensor 21 detects the output current $I_o$ from the high-frequency inverter 11 and the voltage sensor 22 detects the voltage $V_{coil}$ of the heating coil 14.

The current detection unit 23a and the voltage detection unit 23b of the controller 23 adjust the levels of the respective detection signals from the current sensor 21 and the voltage sensor 22 respectively and output the current signal $S_i$ and the voltage signal $S_v$ to the signal processing unit 23c. Then, the signal processing unit 23c rectifies the current signal and the voltage signal inputted from the current detection unit 23a and the voltage detection unit 23b respectively to calculate effective values and outputs the respective effective current and voltage values as the current signal $S_i$ and the voltage signal $S_v$ to the determination unit 23d.

Upon receiving the current signal $S_i$ and the voltage signal $S_v$ from the signal processing unit 23c, the determination unit 23d synchronizes the current signal $S_i$ and the voltage signal $S_v$ with the heating synchronization signal $S_s$ to thereby acquire waveforms. Then, based on the respective waveforms, the determination unit 23d acquires a data sequence of the effective current value and the effective voltage value. Thereafter, the determination unit 23d divides the effective current value by the effective voltage value to thereby calculate a load impedance and determines whether the calculated load impedance is within a stipulated range or not. When the load impedance is not within the threshold value, the determination unit 23d acquires and records the data sequence and outputs a warning signal to the warning unit 24.

During this, the determination unit 23d may compare the effective current value with an upper-limit threshold value and a lower-limit threshold value to determine whether the current signal $S_i$ is higher than the upper-limit threshold value or is lower than the lower-limit threshold value. When the current signal $S_i$ deviates from the threshold value, the waveform is recorded and a warning signal is outputted to the warning unit 24. This can provide the monitoring as described later of a fluctuation in the output from the high-frequency inverter 11. The fluctuation cannot be determined by the monitoring of a load impedance.

Upon receiving the warning signal, the warning unit 24 displays a warning or generates warning sound. Thus, upon recognizing the warning display or the warning sound, a worker performing a hardening can notice that abnormality is caused in the induction hardening. The warning unit 24 may stop the output operation of the high-frequency inverter 11 of the induction hardening apparatus 10.

Figure 13:
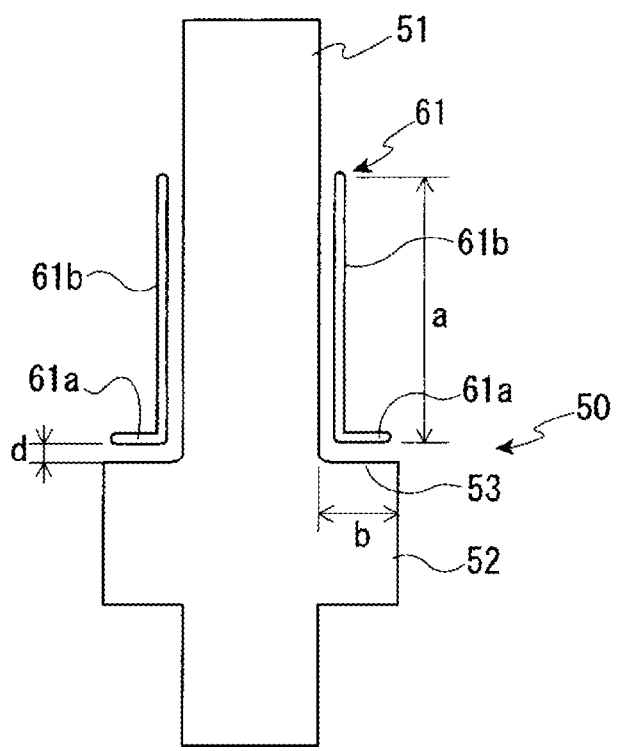
FIG. 13 is a diagram showing the positional relation between the heating coil and the work according to Example 4 in the second embodiment of the present invention

As described above, the current sensor 21 is used to detect the output current from the high-frequency inverter 11. The voltage sensor 22 is used to detect a voltage generated in the heating coil 14. Based on the detection signal from the current sensor 21 and the detection signal from the voltage sensor 22, the load impedance is calculated and a hardening processing is monitored based on the calculated load impedance. As a result, when high-frequency power is inputted to the heating coil 14 via the capacitor 12 from the high-frequency inverter 11 for which the output is controlled so that the output power is constant, even when the output current from the high-frequency inverter 11 has a low fluctuation rate and the coil voltage generated in the heating coil 14 has a low fluctuation rate, a deviation from a reference interval of a positional relation between a work as a hardening target and a heating coil, i.e., an increase of a gap d between the work 50 and the heating coil (hereinafter referred to as a coil gap d) as shown in FIG. 13, mentioned later, can be detected as a fluctuation of the load impedance. Thus, the quality control of the induction hardening processing can be performed easily and accurately.

The following section will describe the reason why the coil gap d appears as the fluctuation of the load impedance even when the output current from the high-frequency inverter 11 has a low fluctuation rate and even when the coil voltage generated in the heating coil 14 has a low fluctuation rate during an induction hardening processing.

Figure 6A:
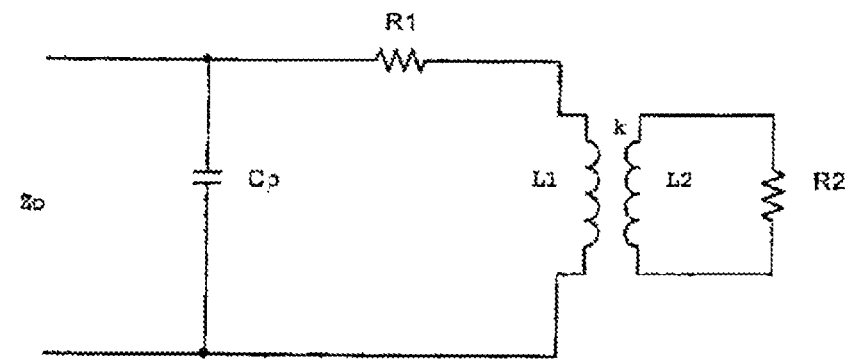
FIGS. 6(A) to 6(C) are a schematic circuit diagram for explaining the reason why a coil gap fluctuation can be observed as a load impedance fluctuation.
Figure 6B:
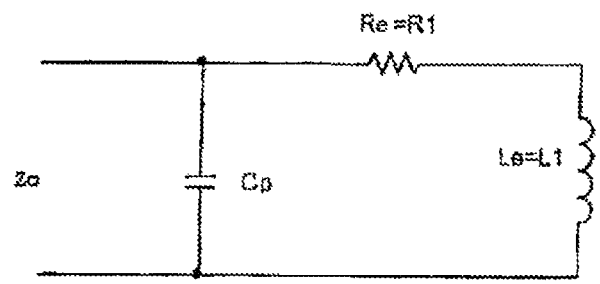
Figure 6C:
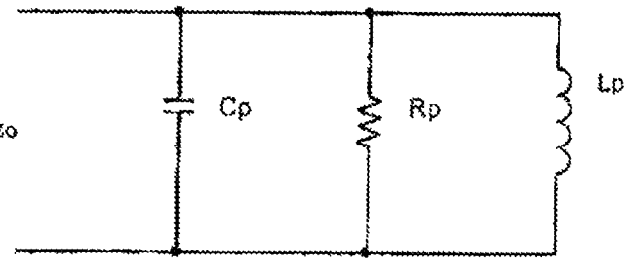

FIGS. 6(A), 6(B), and 6(C) are a schematic circuit diagram for explaining the reason why the fluctuation of the coil gap d can be observed as a load impedance fluctuation. FIG. 6(A) is an equivalent circuit diagram illustrating a model of an induction heating. FIG. 6(B) is an equivalent circuit diagram when no work exists. FIG. 6(C) is a diagram showing the equivalent circuit shown in FIG. 6(B) as a parallel circuit.

Among the induction heating electric circuits, the electric circuit from the high-frequency inverter 11 to the heating coil 14 is shown in the point that, when a transmission loss $R_x$ is omitted as shown in FIG. 6(A), the serial connection of a resistance R1 and a self-inductance L1 is parallelly connected to the matching capacitor Cp. The work 15 is shown as a parallel connection between a self-inductance L2 and a resistance R2. A situation in which the work 15 is placed in the heating coil 14 can be modeled as mutual-inductance. Here, R1 denotes a resistance component of the coil conducting wire, R2 denotes a resistance component of the heating target, L1 denotes an inductance component of the heating coil 14, L2 denotes an inductance component of the heating target, and M denotes a mutual-inductance that changes depending on the gap between the heating coil 14 and the work 15. When assuming that the coupling factor of the self-inductance L1 and the self-inductance L2 is k, the mutual-inductance M satisfies the relation of $k=M/(L1\times L2)^{1/2}$. The load impedance seen from both ends of the matching capacitor Cp is represented by the sum of a reactance component $\omega Le$ and a resistance component Re. It is established that $Le=L1(1-k^2)$ and $Re=R1+A\cdot R2$. In the formula, A is a factor determined depending on the above-described coupling factor k, the load shape, and the heating frequency.

When the gap d between the work 15 and the heating coil 14 increases, the load coupling is reduced. An ultimate situation may be that the load coupling is reduced until k=0 and Re=R1 are reached and finally Le=L1 is reached. Specifically, the equivalent circuit of FIG. 6(A) can be rewritten as shown in FIG. 6(B).

Furthermore, the serial equivalent circuit of FIG. 6(B) can be converted to the parallel equivalent circuit of FIG. 6(C). Since Ze=Re+jwLe is established, an admittance Ye is Ye=1/Ze and thus can be represented by the following formula.

$Ye=Gp+jBp$

Gp and Bp are represented by the following formulae.

$Gp=Re/(Re^2+(\omega Le)^2)$ $BP=\omega Le/(Re^2+(\omega Le)^2)$

In the formulae, Rp=1/Gp and |Xp|=1/|Bp|. Rp and |Xp| are represented by the following formulae.

$Rp=(Re^2+(\omega Le)^2)/Re$ $|Xp|=(Re^2+(\omega Le)^2)/(\omega Le)$

Since $\omega Le^2 \gg Re^2$ is established in a hardening application, the following formula is established.

$Rp=(\omega Le)^2/Re$ $|Xp|\approx \omega Le$

In the formulae, ω denotes an angular frequency of a high frequency outputted from the high-frequency inverter 11.

When the high-frequency inverter has a frequency that corresponds to and that is synchronized with a frequency of the load resonance circuit, the load impedance $Z_o$ can be represented as:

$Z_o=R_p=(\omega Le)^2/Re$

In other words, as is clear from the above approximation formula, an increase in the gap d between the work 15 and the heating coil 14 causes a decrease in the load coupling, an increase in Le, a decrease in Re, and an increase in the load impedance $Z_o$. Furthermore, the load impedance $Z_o$ has a change rate that is higher than those of Le and Re, respectively.

Therefore, when the output power from the high-frequency inverter 11 is constant and the coil gap d increases, the output current from the high-frequency inverter 11 decreases and the coil voltage increases. Thus, even when the output current has a small decrease rate and even when the coil voltage has a small increase rate, the coil voltage ratio to the output current (i.e., load impedance) increases. Thus, an increase in the coil gap d directly appears as a fluctuation of the load impedance.

As can be seen from the above, when the output power of the high-frequency inverter 11 is controlled to be constant in the induction hardening processing, the fluctuation of the load impedance is monitored by the determination unit 23d to confirm that the fluctuation of the load impedance is within the range of the upper-limit and lower-limit threshold values. By doing this, the induction hardening monitoring can be performed efficiently. Furthermore, the controller 23 preferably calculates the output current from the high-frequency inverter 11 based on the detection signal from the current sensor 21 to confirm that the fluctuation of this output current is within the range of the upper-limit and lower-limit threshold values. By doing this, whether the gap is within an allowable range or not can be confirmed by monitoring the load impedance. At the same time, the fluctuation of the output current from the high-frequency inverter 11 can be monitored to thereby confirm that energy required for the hardening is inputted, thus providing a high-quality hardening control.

The measurement data generated by the hardening monitoring unit 20 as described above is stored, as in the first embodiment, in the memory unit 72 of the hardening control unit 70. Thus, as in the first embodiment, the data collecting unit 80 requests, via a communication means, the hardening control unit 70 for setup conditions data, measurement data, and detection data also in the second embodiment. Upon the request, the hardening control unit 70 sends the setup conditions data, measurement data, and detection data for the induction hardening processing to the data collecting unit 80 via the communication means. Then, upon receiving the setup conditions data, measurement data, and detection data, the data collecting unit 80 stores the received setup conditions data, measurement data, and detection data in a database while being associated to one another.

The setup conditions data, measurement data, and detection data stored in the database as described above can be searched and read by inputting information identifying the induction hardening processing by the data collecting unit 80. Based on an instruction from a user, the data editing unit 90 obtains the setup conditions data, measurement data, and detection data from the data collecting unit 80 and displays these pieces of data by spreadsheet software. Therefore, the operator can confirm these pieces of data through the spreadsheet displayed on a screen. In other words, the user can always easily and quickly extract the setup conditions data regarding the desired induction hardening processing as well as associated measurement data and detection data also in the second embodiment. Therefore, the second embodiment also can provide a secure control for the induction hardening processing.

A modification example of the second embodiment will be described.

Figure 7:
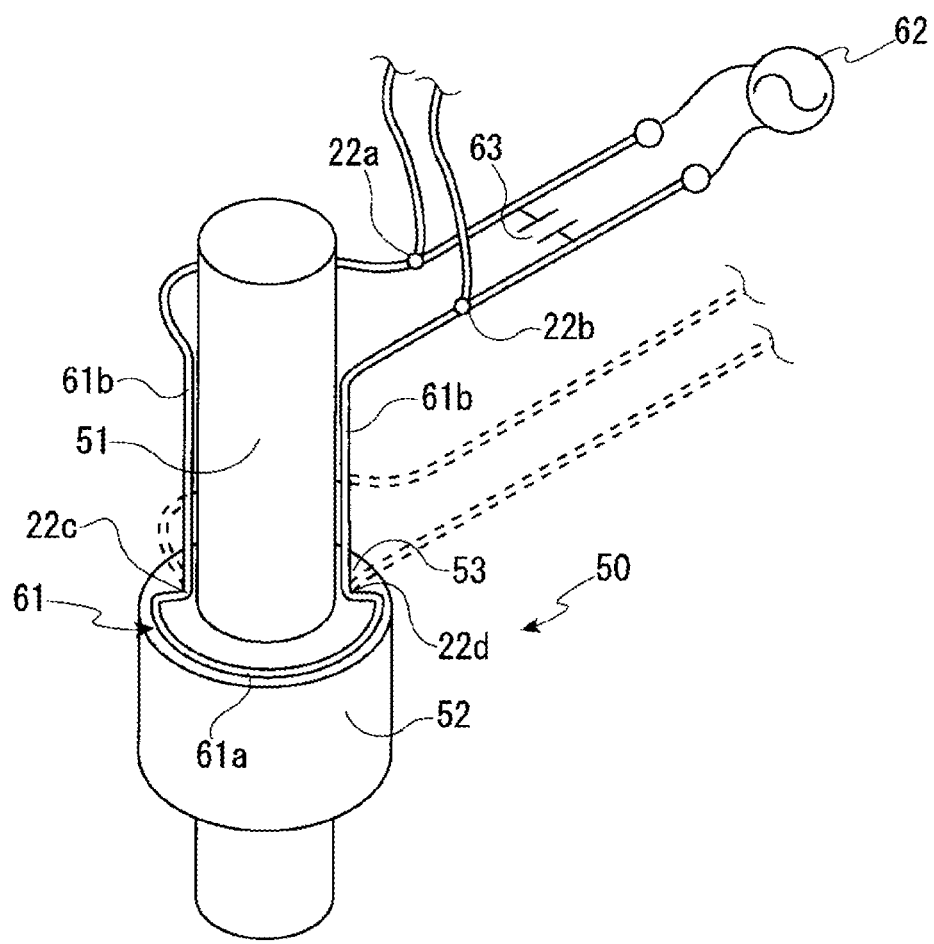
FIG. 7 is a schematic diagram for explaining a modification example of the second embodiment of the present invention.
Figure 29:
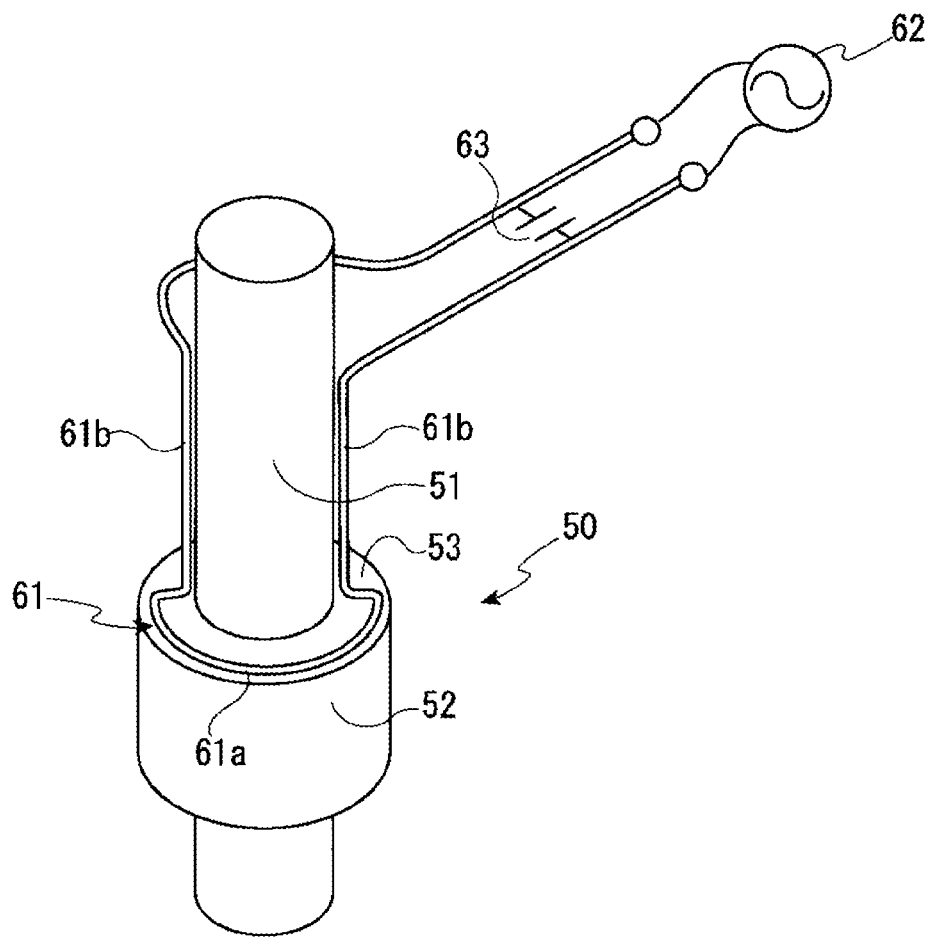
FIG. 29 is a diagram schematically showing a general hardening processing.

FIG. 7 is a schematic diagram for explaining a modification example of the present invention. The same components as those of FIG. 29 are denoted with the same reference numerals. As shown by the dotted line in FIG. 7, the ends 22c and 22d of voltage sensor 22 are arranged so that the voltages at both ends of the semicircular portion 61a of the coil are detected as a coil voltage. As a result, the fluctuation of the coil gap d can be efficiently reflected on the load impedance.

A configuration as in this modification example is preferred where the semicircular portion 61a is provided in which the heating coil 61 is provided to have the predetermined gap d to the hardening target region of the work 50 and, as shown by the dotted line in FIG. 7, both end portions 22c and 22d of the voltage sensor 22 are connected to both ends of the semicircular portion 61a so as to detect the voltage between the both ends of the semicircular portion 61a. When this configuration where the end portions 22c and 22d of the voltage sensor 22 are connected to both ends of the semicircular portion 61a as shown by the dotted line is compared with a case where both ends 22a and 22b of the voltage sensor 22 are connected via the straight portions 61b, 61b as shown by the solid line, the fluctuation rate of the coil gap can be detected with a higher sensitivity, thus providing a more accurate hardening monitoring.

From the above, when the high-frequency power is controlled to be constant, an increase of the coil gap d causes an increase of the load impedance and, based on this fluctuation of the load impedance, whether the hardening processing is performed correctly or not can be determined.

The induction hardening control system 1 according to the second embodiment is not limitedly applied to the induction hardening apparatus 10 shown in FIGS. 1 and 3. The induction hardening monitoring apparatus according to the second embodiment can be applied to an induction hardening apparatus having an equivalent circuit configuration including a resonance circuit having a matching capacitor and a heating coil and a high-frequency inverter. For example, the current transformer 13 may be omitted.

The following section will describe Examples 1 to 3 and Comparison Examples 1 and 2 corresponding to the first embodiment and Example 4 and Comparison Example 3 corresponding to the second embodiment.

EXAMPLE 1

The induction hardening control system 1 shown in FIG. 1 was used to perform a load evaluation test.

As the high-frequency inverter 11, an inverter was used for which a DC voltage was controlled to be constant to thereby output a high frequency of 25 kHz. As a parallel resonance-type load circuit, the matching capacitor 12 of 10 µF and the current transformer 13 having a turn ratio of 6:1 were used. Such a saddle-type receiving unit including therein the heating coil 14 and receiving the work 15 was used that had an inner diameter of 40 mm and a width of 4 mm. The work 15 used was a circular pipe having an outer shape of 33 mm and a thickness of 5.5 mm. In Example 1, the work 15 was placed so that the gap between an end face of the saddle-type receiving unit and the outer shape of the work has a standard value of 4 mm. The output power from the high-frequency inverter 11 was set to 50% of the set volume and the output power from the high-frequency inverter 11 was set to be outputted for 1 second. For the determination unit 23d, the reference ranges for the coil voltage $V_{coil}$ and the current $I_o$ were set in advance. In detail, the work 15 was placed in a standard status to the saddle-type receiving unit and then the work 15 was hardened. Then, the current sensor 21 and the voltage sensor 22 were used to sample the respective waveforms of the current signal $S_i$ and the voltage signal $S_v$. Then, it was confirmed that the quality is within the predetermined range. Then, the sampled waveforms were respectively assumed as reference waveforms and, along the respective reference waveforms, an upper limit and a lower limit were set for the voltage value on the vertical axis and the time on the horizontal axis. In this Example, the upper and lower limit set values for the voltage $V_{coil}$ was ±4.3% (±50 mV), the value set for the time axis was ±4.8 (±48 ms), the upper and lower limit set values for the current L was ±3.8% (±20 mV), and the value set for the time axis was ±4.8% (±48 ms).

Figure 8:
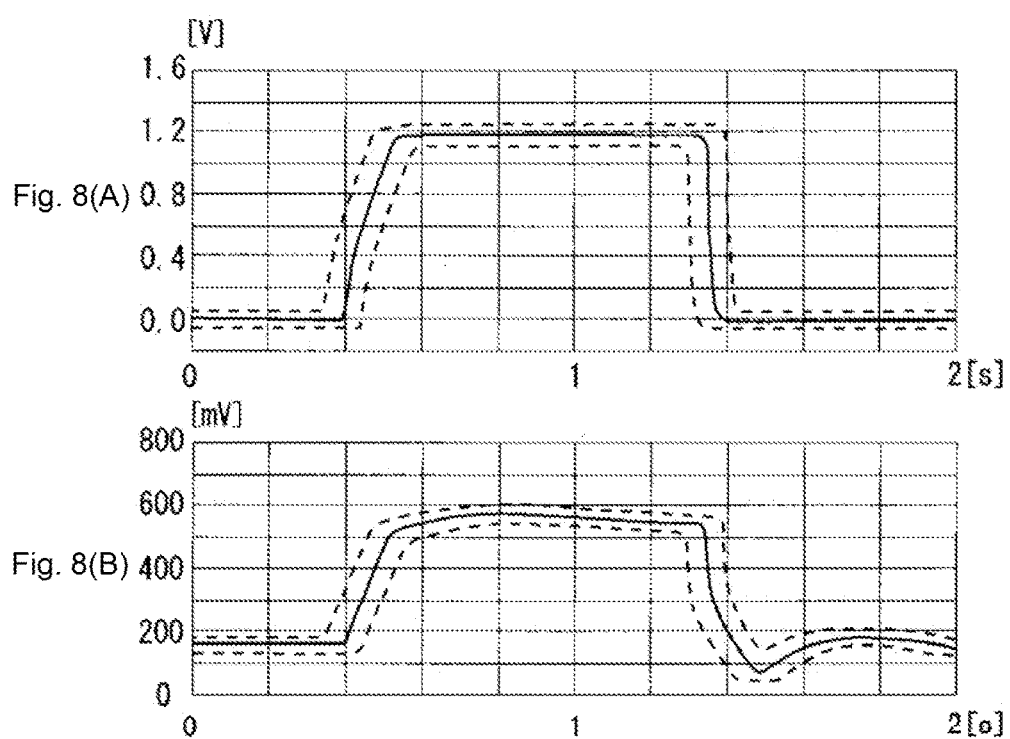
FIGS. 8(A) and 8(B) show the result of Example 1 in the first embodiment of the present invention.

FIGS. 8(A) and 8(B) show the result of Example 1 in the first embodiment. FIG. 8(A) shows a signal waveform corresponding to the voltage in the heating coil 14. FIG. 8(B) shows a signal waveform corresponding to the output current from the high-frequency inverter 11. In the drawings, the solid lines represent the respective waveforms and the dotted lines represent the range of the upper-limit and lower-limit threshold values. In Example 1, the gap is 4 mm of the reference value. Thus, as can be seen from FIGS. 8(A) and 8(B), the waveform is at substantially the center of the upper-limit and lower-limit threshold values and the determination by the determination unit 23d was "fine". The output power and the output voltage from the high-frequency inverter 11 were 18 kW and 290V, respectively. The signal of the voltage $V_{coil}$ of the heating coil 14 was 1.157V (which corresponds to $V_{coil}$ of 1.157×200/5V) and the signal of the output current $I_o$ of the high-frequency inverter 11 was 0.529V (which corresponds to $I_o$ of 0.529×500/5 A).

EXAMPLE 2

Example 2 had the same configuration as that of Example 1 except for that the work 15 was placed so that the gap between the end face of the saddle-type receiving unit and the outer shape of the work 15 was 6 mm.

Figure 9:
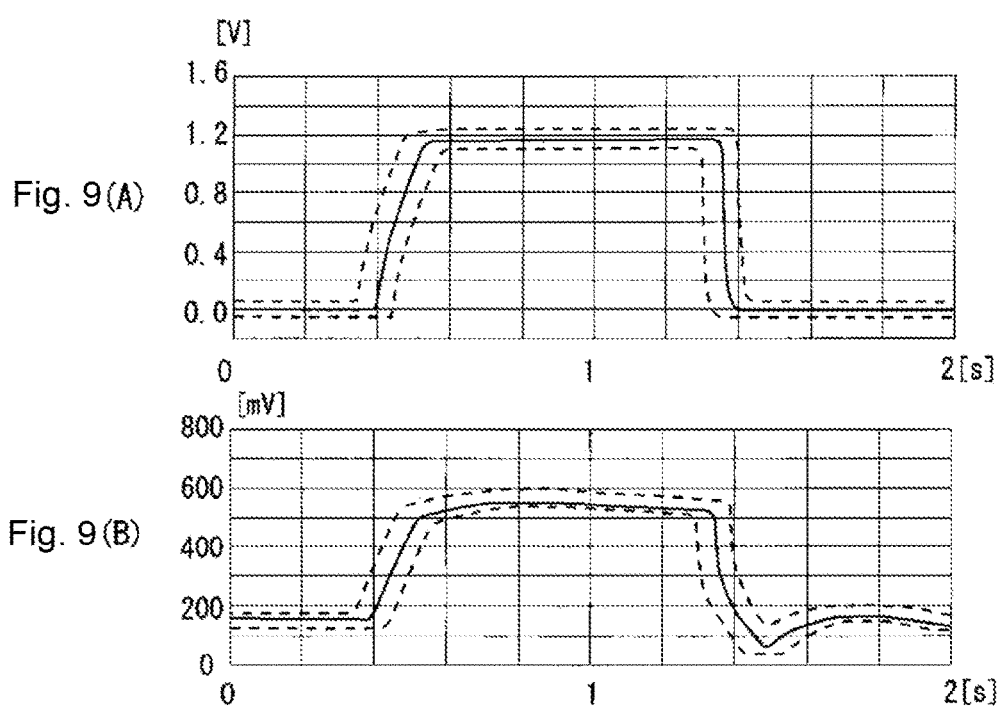
FIGS. 9(A) and 9(B) show the result of Example 2 in the first embodiment of the present invention.

FIGS. 9(A) and 9(B) show the result of Example 2 in the first embodiment. FIG. 9(A) shows a signal waveform corresponding to the voltage in the heating coil 14. FIG. 9(B) shows a signal waveform corresponding to the output current from the high-frequency inverter 11. In the drawings, the solid lines represent the respective waveforms and the dotted lines represent the range of the upper-limit and lower-limit threshold values. In Example 2, the gap is wider than the reference value of 4 mm. Thus, as can be seen from FIGS. 9(A) and 9(B), although the waveform of the current was at the lower limit-side than the substantially the center of the upper-limit and lower-limit threshold values, the waveform of the current was within the range of threshold values. Thus, the determination by the determination unit 23d was "fine". The output power and the output voltage from the high-frequency inverter 11 were 18 kW and 290V, respectively. The signal of the voltage $V_{coil}$ of the heating coil 14 was 1.172V (which corresponds to $V_{coil}$ of 1.172× 200/5V) and the signal of the output current L of the high-frequency inverter 11 was 0.520V (which corresponds to $I_o$ of 0.520×500/5 A).

EXAMPLE 3

Example 3 had the same configuration as that of Example 1 except for that the work 15 was placed so that the gap between the end face of the saddle-type receiving unit and the outer shape of the work 15 was 7 mm.

Figure 10:
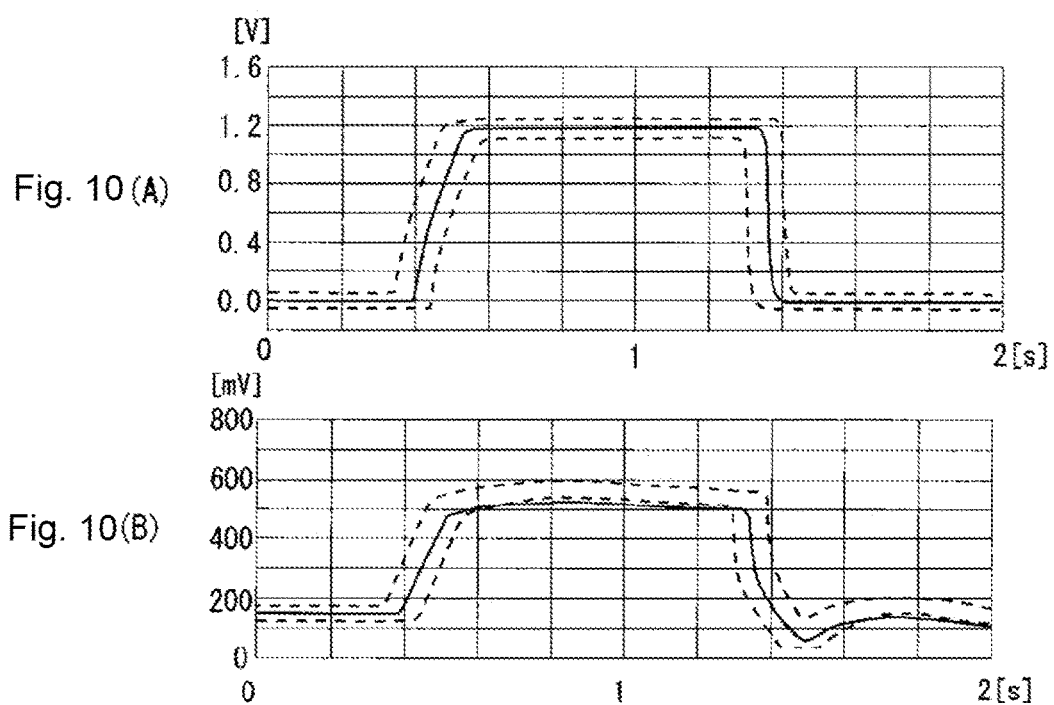
FIGS. 10(A) and 10(B) show the result of example 3 in the first embodiment of the present invention.

FIGS. 10(A) and 10(B) show the result of Example 3 in the first embodiment. FIG. 10(A) shows a signal waveform corresponding to the voltage in the heating coil 14. FIG. 10(B) shows a signal waveform corresponding to the output current from the high-frequency inverter 11. In the drawings, the solid lines represent the respective waveforms and the dotted lines represent the range of the upper-limit and lower-limit threshold values. In Example 3, the gap of 7 mm is further wider than the reference value of 4 mm. Thus, as can be seen from FIGS. 10(A) and 10(B), the signal waveform of the current was partially extruded from the lower limit of the threshold value. Thus, the hardening processing is determined as "not fine". The output power and the output voltage from the high-frequency inverter 11 were 17 kW and 290V, respectively. The signal of the voltage $V_{coil}$ of the heating coil 14 was 1.162V (which corresponds to $V_{coil}$ of 1.162×200/5V) and the signal of the output current $I_o$ of the high-frequency inverter 11 was 0.500V (which corresponds to $I_o$ of 0.500×500/5 A).

COMPARISON EXAMPLE 1

The following section will describe comparison examples.

In comparison examples, the induction hardening control system 1 was configured so that the current sensor 21 connected to the wiring between the high-frequency inverter 11 and the matching capacitor 12 was connected, as shown by the broken line in FIG. 3, to the primary-side of the current transformer 13 so that the current sensor 21 detects the primary current $I_{ctrl-1}$ of the transformer.

As in examples 1 to 3, the output power from the high-frequency inverter 11 was set to 50% of the set volume and the output power from the high-frequency inverter 11 was set to be outputted for 1 second. For the determination unit 23d, the upper and lower limit set values for the voltage $V_{coil}$ were ±4.3% (±50 mV), the value set for the time axis was ±4.8 (±48 ms), the upper and lower limit set values for the current $I_o$ were ±3.8% (±125 mV), and the value set for the time axis was ±4.8% (±48 ms). The reason is that, regarding the setting of the upper and lower limit values for the current $I_o$, since the current to be measured as a target was changed from the output current $I_o$ of the high-frequency inverter 11 to the primary current $I_{ctrl-1}$ of the current transformer 13, the current value increases even when the upper and lower set values are set within the same range (%).

In Comparison Example 1, the gap between the saddle-type receiving unit and the work was set to 4 mm as in Illustrative Embodiment 1.

Figure 11:
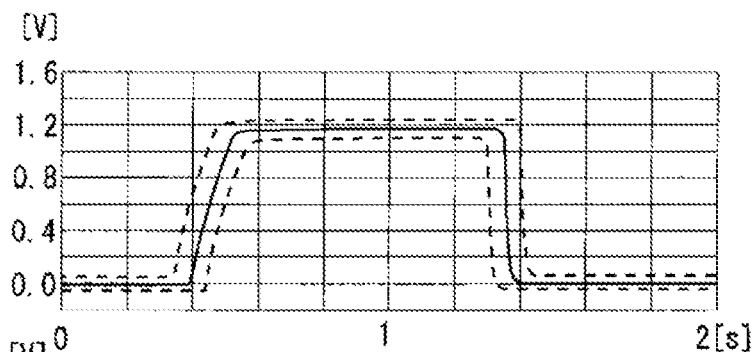
FIGS. 11(A) and 11(B) show the result of Comparison Example 1 in the first embodiment of the present invention.
Figure 11:
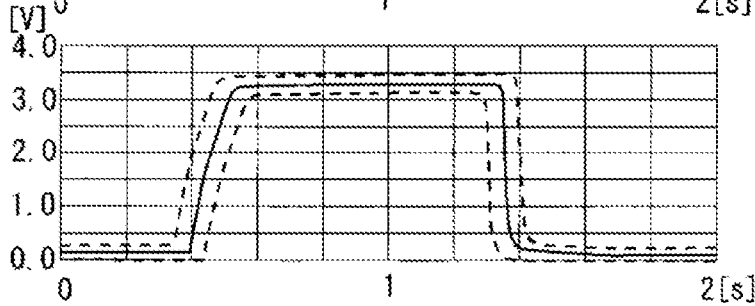

FIGS. 11(A) and 11(B) show the result of Comparison Example 1 in the first embodiment. FIG. 11(A) shows a signal waveform corresponding to the voltage in the heating coil 14. FIG. 11(B) shows a signal waveform corresponding to the primary-side current of the current transformer 13. In the drawings, the solid lines represent waveforms and the dotted lines represent the range of the upper-limit and lower-limit threshold values.

In Comparison Example 1, since the gap has the reference value of 4 mm, as can be seen from FIGS. 11(A) and 11(B), the respective current and voltage signal waveforms are both at substantially the center of the upper-limit and lower-limit threshold values and the determination by the determination unit 23d was "fine". The output power and the output voltage from the high-frequency inverter 11 were 18 kW and 290V, respectively. The signal of the voltage $V_{coil}$ of the heating coil 14 was 1.170V (which corresponds to $V_{coil}$ of 1.170×200/5V) and the signal of the primary current $I_{crtl-1}$ was 3.287V (which corresponds to $I_{crtl-1}$ of 3.287×500/5 A).

COMPARISON EXAMPLE 2

In Comparison Example 2, the hardening was performed in the same manner as in Comparison Example 2 except for that the gap between the saddle-type receiving unit and the work was 7 mm.

Figure 12A:
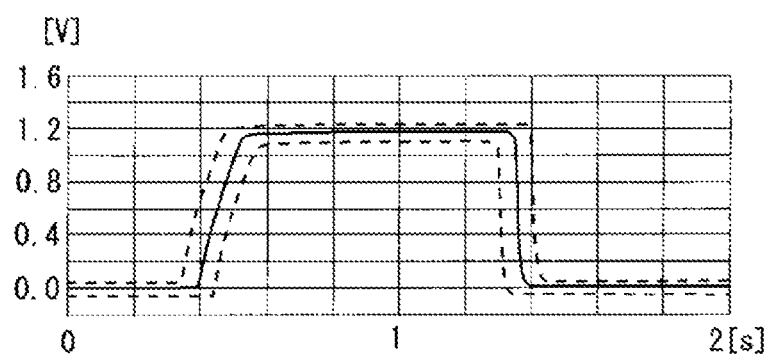
FIGS. 12(A) and 12(B) show the result of Comparison Example 2 in the first embodiment of the present invention.
Figure 12B:
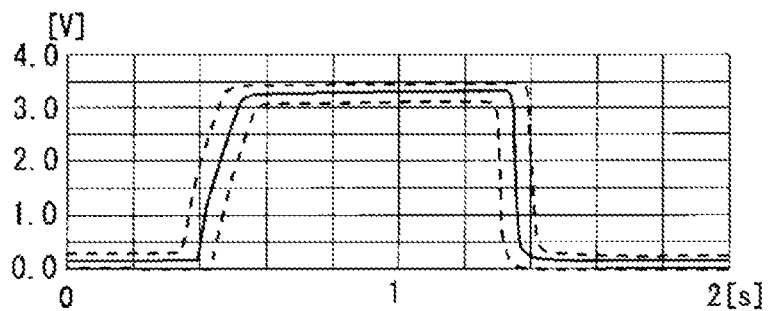

FIGS. 12(A) and 12 (B) show the result of Comparison Example 2 in the first embodiment. FIG. 12(A) shows a signal waveform corresponding to the voltage in the heating coil 14. FIG. 12(B) shows a signal waveform corresponding to the primary-side current of the current transformer 13. In the drawings, the solid lines represent waveforms and the dotted lines represent the range of the upper-limit and lower-limit threshold values.

In Comparison Example 2, in spite of the gap wider than the reference gap of 4 mm, as can be seen from FIG. 12, the signal waveform of the voltage and the signal waveform of the primary-side current of the current transformer 13 were both at substantially the center of the upper-limit and lower-limit threshold values and thus the determination by the determination unit 23d was "fine". The output power and the output voltage from the high-frequency inverter 11 were 17 kW and 290V, respectively. The signal of the voltage $V_{coil}$ of the heating coil 14 was 1.166V (which corresponds to $V_{coil}$ of 1.166×200/5V) and the signal of the primary current $I_{crtl-1}$ was 3.281V (which corresponds to $I_{crtl-1}$ of 3.281×500/5 A).

TABLE 1

| | Gap between work and receiving unit [mm] | Output power [kW] | Determination unit | | |
|---|---|---|---|---|---|
| | | | Sv [V] | Si [V] | Determination result |
| Example 1 | 4.00 | 18 | 1.157 | 0.529 | Fine |
| Example 2 | 6.00 | 18 | 1.172 | 0.520 | Fine |
| Example 3 | 7.00 | 17 | 1.162 | 0.500 | Not Fine |
| Comparison Example 1 | 4.00 | 18 | 1.170 | 3.287 | Fine |
| Comparison Example 2 | 7.00 | 17 | 1.166 | 3.281 | Fine |

Table 1 shows the results of Examples 1 to 3 and Comparison Examples 1 and 2. The results as shown below are obtained, in the induction hardening control system 1, when a case as in Illustrative Embodiments 1 to 3 where the wiring between the high-frequency inverter 11 and the matching capacitor 12 is electrically connected to the current sensor 21 is compared with a case as in Comparison Examples 1 and 2 where the wiring between the high-frequency inverter 11 and the matching capacitor 12 is electrically connected to the primary-side of the current transformer 13.

When the output current $I_o$ from the high-frequency inverter 11 is detected as in Examples 1 to 3, when the gap is increased from the reference value of 4 mm through 6 mm to 7 mm in this order, the signal $S_i$ of the output current $I_o$ detected by the current sensor 21 changes, when being converted to a voltage, from 0.529V through 0.520V to 0.500V. When the change rate from a case where the reference value is 4 mm is calculated, the change rate is about −1.7% when the gap is 6 mm and the change rate is about −5.5% when the gap is 7 mm. Thus, the determination unit 23d can determine a deviation from ±3.8% of the upper-limit and lower-limit threshold values (which is ±20 mV when being converted to a voltage).

On the other hand, when the gap is increased from the reference value of 4 mm to 7 mm as in Comparison Examples 1 and 2, the output power (the value shown by the meter) increases from 18 kW to 17 kw. Thus, in spite of the change of about −5.5% of the signal $S_i$ of the detected current, the current $I_{ctrl-1}$ in the determination unit 23d is substantially the same that in the case where the gap is 4 mm. This is within the range of threshold values. Thus, the determination unit 23d determines "fine". Thus, when the primary-side current of the current transformer 13 is detected as in Comparison Examples 1 and 2, the induction hardening cannot be monitored accurately.

The reason of this will be considered below. Since the comparison examples monitor the primary current $I_{ctrl-1}$ as a target, this is given by an equivalent circuit configuration of the vector synthesis of the effective current flowing in the parallel resistance and the reactive current flowing in the parallel inductance $(=(I_R^2+I_L^2)^{1/2})$. Thus, a small change of the gap between the work 15 and the heating coil 14 causes a small change of inductance. Thus, in the case that the resonance sharpness Q is equal to or higher than 4 to 5, the above vector synthesis does not significantly change even when the effective current changes.

On the other hand, since in the present invention the effective current is detected, a change of a parallel resistance due to a change of the gap is directly and proportionally reflected on the detection current. Therefore, a change of the monitoring current can be detected easily.

EXAMPLE 4

The induction hardening control system 1 shown in FIG. 1 was used to perform a load evaluation test. A saddle-type coil was used as the heating coil and a work was used as a hardening processing target. FIG. 13 is a diagram showing the positional relation between the heating coil 61 and a bar-like member as the work 50 according to Example 4 in the second embodiment of the present invention. In FIGS. 11(A) and 11(B), the same or corresponding members as those of FIG. 29 are denoted with the same reference numerals.

As shown, the work 50 as a heating target is configured so that the bar-like base portion 51 includes the extension portion 52 in a coaxial manner. Thus, the bar-like base portion 51 and the extension portion 52 form a substantially L-like cross section. It was assumed that the portion of the heating coil 61 opposed to the straight portion 61b had a size a and the portion of the heating coil 61 opposed to the semicircular portion 61a had a size b. It was also assumed that the distance between the semicircular portion 61a of the heating coil 61 and the upper face 53 of the work 50, i.e., the coil gap, was d. Such a high-frequency inverter 11 was used that outputs high frequency having a frequency of 10 kHz and for which the output power can be controlled to be constant without depending on the load. As a parallel resonance-type load circuit, the matching capacitor 12 in which four pieces of 4.15 μF were parallelly connected and the current transformer 13 having a turn ratio of 8:1 were used.

The heating coil 61 was placed to the work so that the coil gap d was 1.5, 1.7, 1.9, 2.1, 2.3, and 2.5 mm, respectively. Then, at each coil gap d, while the work 50 is being rotated around the axis at a speed of 500 rpm, high-frequency power of 150 kW was inputted for 5.5 seconds to thereby perform a hardening processing.

In Example 4, the numerical value of the reference range of the load impedance was set in the determination unit 23d in advance. The reference range of the load impedance was set so that the upper limit was 1.78Ω and the lower limit was 1.712Ω. Furthermore, the output current from the high-frequency inverter was measured. The reference range of the output current L was set so that the upper limit was 290 A and the lower limit was 250 A.

Figure 14:
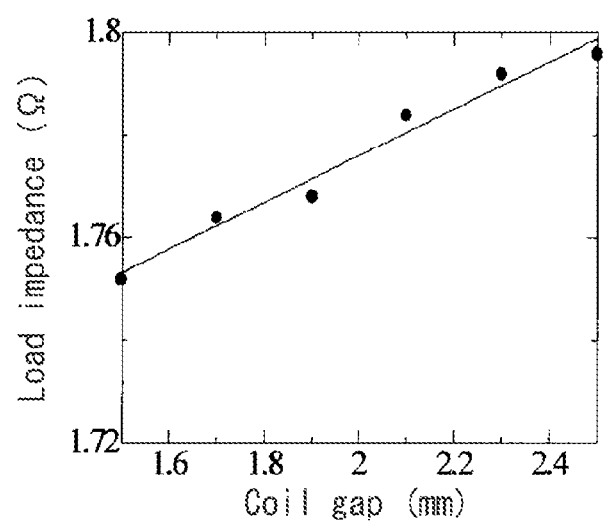
FIG. 14 is a diagram showing the coil gap dependency of the load impedance in the result of Example 4 in the second embodiment of the present invention.
Figure 15:
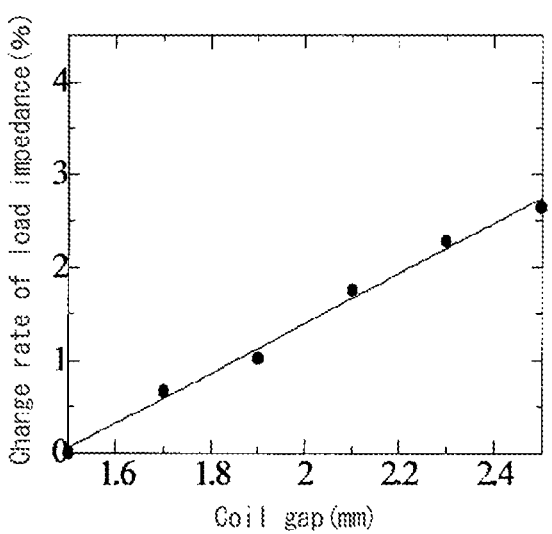
FIG. 15 is a diagram showing the coil gap dependency to the load impedance change rate in the result of Example 4 in the second embodiment of the present invention.
Figure 16:
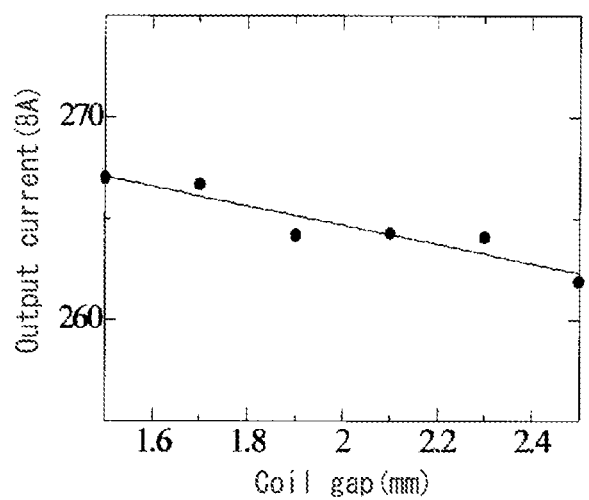
FIG. 16 is a diagram showing the coil gap dependency of the output current from the high-frequency inverter in the result of Example 4 in the second embodiment of the present invention.
Figure 17:
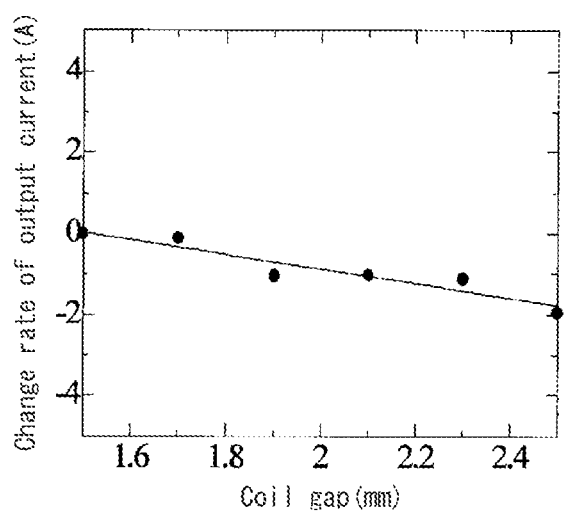
FIG. 17 is a diagram showing the coil gap dependency of the change rate of the output current from the high-frequency inverter in the result of Example 4 in the second embodiment of the present invention.

The following section will describe the result of Example 4. FIG. 14 is a diagram showing the coil gap dependency of the load impedance in the result of Example 4 of the second embodiment. FIG. 15 is a diagram showing the coil gap dependency to the load impedance change rate in the second embodiment. FIG. 16 is a diagram showing the coil gap dependency of the output current from the high-frequency inverter in the second embodiment. FIG. 17 is a diagram showing the coil gap dependency of the change rate of the output current from the high-frequency inverter in the second embodiment. In the drawings, all of the horizontal axes represent a coil gap. The vertical axis in FIG. 14 represents the load impedance. The vertical axis in FIG. 15 represents the load impedance change rate. The vertical axis in FIG. 16 represents the output current from the high-frequency inverter. The vertical axis in FIG. 17 represents the change rate of the output current from the high-frequency inverter. The change rate of each value was calculated, when assuming that the value at the coil gap d was f(d), by centuplicating the formula (f(d)−f(1.5))/f(1.5).

As can be seen from FIG. 14, the load impedance is 1.752Ω when the coil gap d has the standard value of 1.5 mm. However, with an increase of d, the load impedance linearly increases. When d is 2.1 mm, the load impedance exceeds the upper limit of the reference range. As can be seen from FIG. 15, the change rate of the load impedance increases by about 1.8% when d is 2.1 and increases to 2.6% when d is 2.5 mm.

As can be seen from FIG. 16, the output current from the high-frequency inverter is about 267 A when the coil gap d has the standard value of 1.5 mm. However, with an increase of d, the output current from the high-frequency inverter linearly decreases and decreases to about 262 A when d is 2.5 mm. As can be seen from FIG. 17, the change rate of the output current decreases by 1.9% when d is 2.5 mm.

Figure 18A:
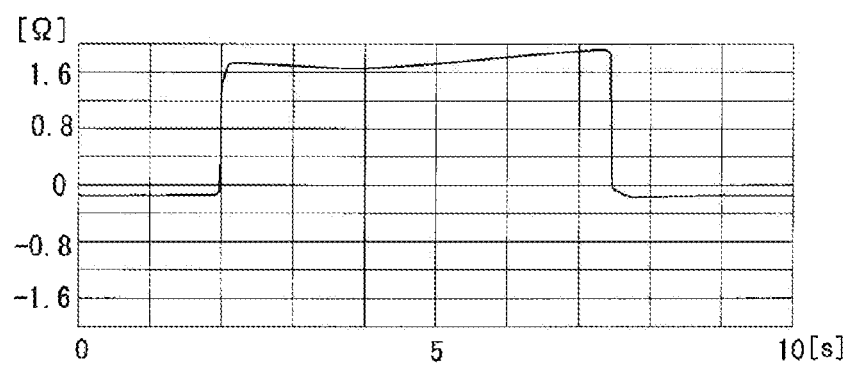
FIGS. 18(A) and 18(B) show waveforms when the coil gap d is 1.5 mm in the result of Example 4 in the second embodiment of the present invention.
Figure 18B:
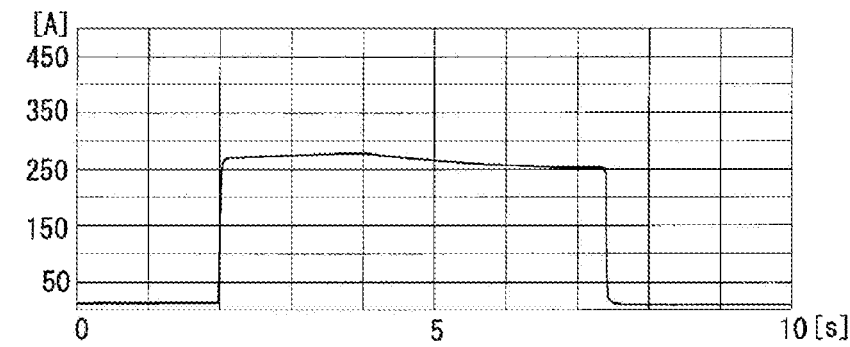
Figure 19:
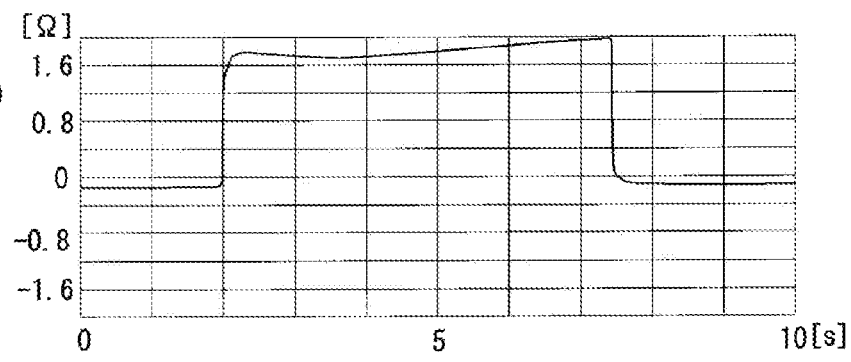
FIGS. 19(A) and 19(B) show waveforms when the coil gap d is 2.1 mm in the result of Example 4 in the second embodiment of the present invention.
Figure 19:
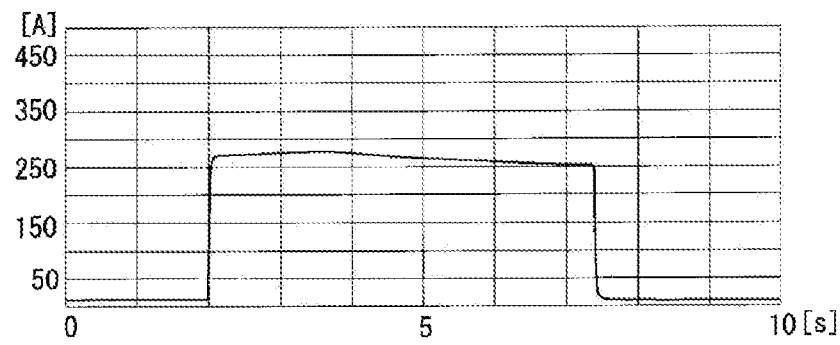

Among the results of the forth embodiment 4 in the second embodiment, FIGS. 18(A) and 18(B) show the waveform when the coil gap d is 1.5 mm. Among the results of the forth embodiment 4 in the second embodiment, FIG. 18(A) shows the waveform of the load impedance. FIG. 18(B) shows the waveform of the output current. FIGS. 19(A) and 19(B) show the waveform when the coil gap d is 2.1 mm. FIG. 19(A) shows the waveform of the load impedance. FIG. 19(B) shows the waveform of the output current. As can be seen, in both of the case where the coil gap d is 1.5 mm and the case where the coil gap d is 2.1 mm, the load impedance rapidly increases by the start of the induction hardening and then slightly decreases to subsequently increase. In accordance with this, it can be seen that the output current rapidly increases by the start of the induction hardening and then slightly increases to subsequently slightly decrease. A similar tendency was found when the coil gap d was 1.7 mm, 1.9 mm, 2.3 mm, and 2.5 mm.

The above result shows that the change rate of the load impedance to the coil gap d has an absolute value higher than that of the change rate of the output current to the coil gap d. This shows that, when an induction hardening processing is performed, the induction hardening processing is preferably monitored by measuring the load impedance. By monitoring the output current $I_o$ from the high-frequency inverter, the stability of the high-frequency inverter 11 can be inferred.

COMPARISON EXAMPLE 3

Next, Comparison Example 3 is shown.

Comparison Example 3 is different from Example 4 in that the load impedance is not used for monitoring and the coil voltage and the output current from the high-frequency inverter are measured for monitoring. The other conditions are the same as those of Illustrative Embodiment 4.

Regarding the hardening monitoring, the determination unit 23*d* was set with the reference range of the coil voltage $V_{coil}$ and the current $I_o$ in advance. In detail, the work 50 was placed in a predetermined standard status and then the work 50 was subjected to hardening. Then, the current sensor 21 and the voltage sensor 22 were used to sample the respective waveforms of the current signal $S_t$ and the voltage signal $S_v$. Then, it was confirmed that the quality was within the predetermined range. Then, the respective sampled waveforms were used as a reference waveform to set an upper limit and a lower limit for the voltage value along the vertical axis and the time along the horizontal axis along the respective reference waveforms. Then, the upper limit of the coil voltage $V_{coil}$ was set to 61V and the lower limit was set to 55V. The upper limit of the output current $I_o$ was set to 290 A and the lower limit was set to 250 A.

Figure 20:
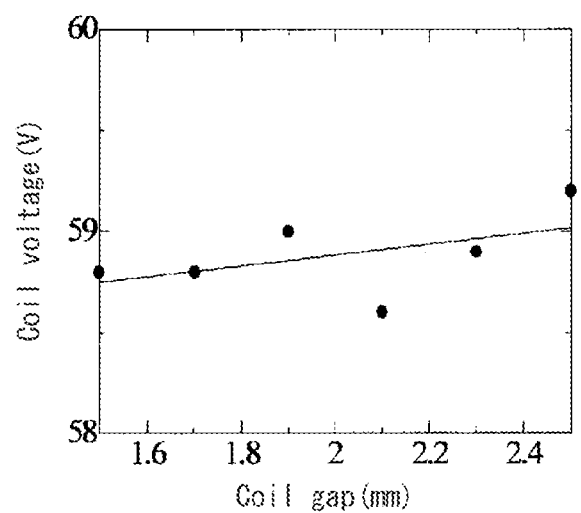
FIG. 20 is a diagram showing the coil gap dependency of the coil voltage in the result of Comparison Example 3 in the second embodiment of the present invention.
Figure 21:
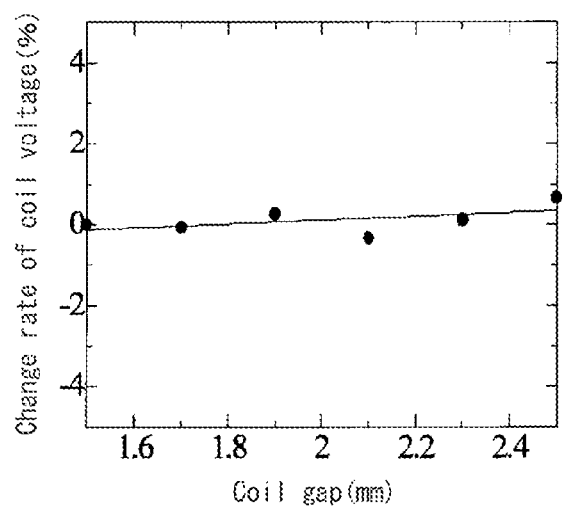
FIG. 21 is a diagram showing the coil gap dependency on the change rate of the coil voltage in the result of Comparison Example 3 in the second embodiment of the present invention.
Figure 22:
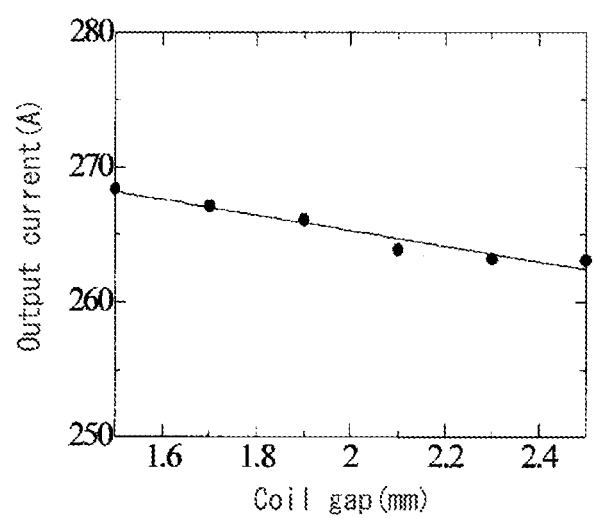
FIG. 22 is a diagram showing the coil gap dependency of the output current from the high-frequency inverter in the result of Comparison Example 3 in the second embodiment of the present invention.
Figure 23:
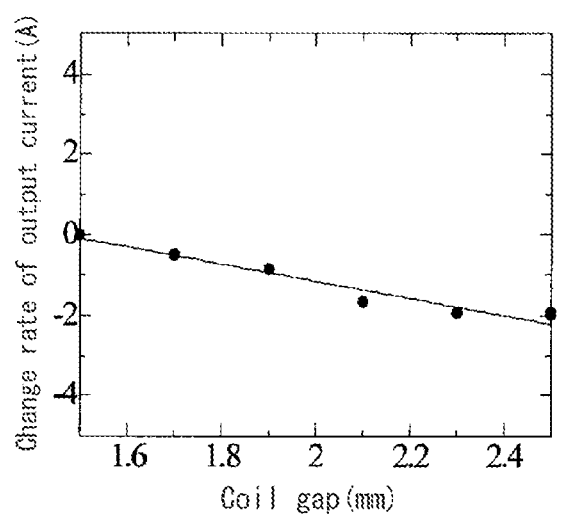
FIG. 23 is a diagram showing the coil gap dependency of the change rate of the output current from the high-frequency inverter in the result of Comparison Example 3 in the second embodiment of the present invention.

The following section will describe the result of Comparison Example 3. Among the results of the Comparison Example 3 in the second embodiment, FIG. 20 is a diagram showing the coil gap dependency of the coil voltage. Among the results of the Comparison Example 3 in the second embodiment, FIG. 21 is a diagram showing the coil gap dependency to the change rate of the coil voltage. Among the results of the Comparison Example 3 in the second embodiment, FIG. 22 is a diagram showing the coil gap dependency of the output current from the high-frequency inverter. Among the results of the Comparison Example 3 in the second embodiment, FIG. 23 is a diagram showing the coil gap dependency of the change rate of the output current from the high-frequency inverter. In the drawings, all of the horizontal axes represent a coil gap. In FIG. 20, the vertical axis represents a coil voltage. In FIG. 21, the vertical axis represents the change rate of the coil voltage. In FIG. 22, the vertical axis represents the output current from the high-frequency inverter. In FIG. 23, the vertical axis represents the change rate of the output current from the high-frequency inverter. The change rate was calculated as in the illustrative embodiments.

As can be seen from FIG. 20, the coil voltage is 58.8V when the coil gap d has the standard value of 1.5 mm. However, with an increase of d, the coil voltage linearly increases and is about 59.2V when d is 2.5 mm. As can be seen from FIG. 21, the change rate of the coil voltage increases to 0.68% when d is 2.5 mm.

As can be seen from FIG. 22, the output current from the high-frequency inverter is about 268.4 A when the coil gap d has the standard value of 1.5 mm. However, with an increase of d, the coil voltage linearly decreases and decreases to about 263 A when d is 2.5 mm. As can be seen from FIG. 23, the change rate of the output current decreases by about 1.9% when d is 2.5 mm.

Figure 24A:
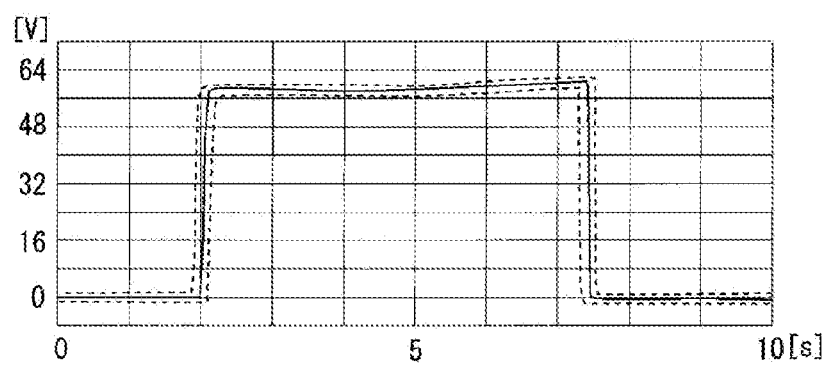
FIGS. 24(A) and 24(B) show waveforms when the coil gap d is 1.5 mm in the result of Comparison Example 3 in the second embodiment of the present invention.
Figure 24B:
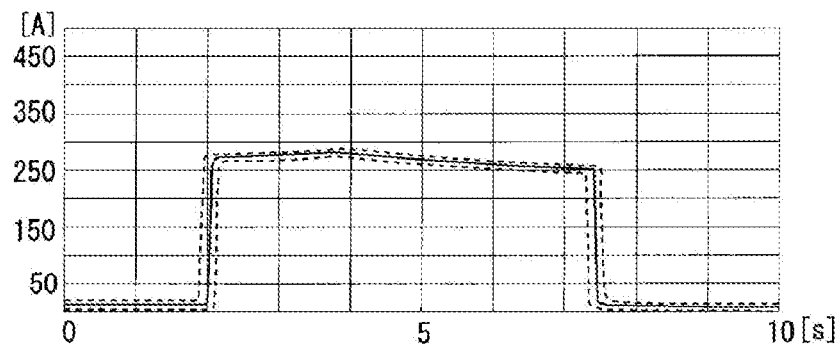
Figure 25A:
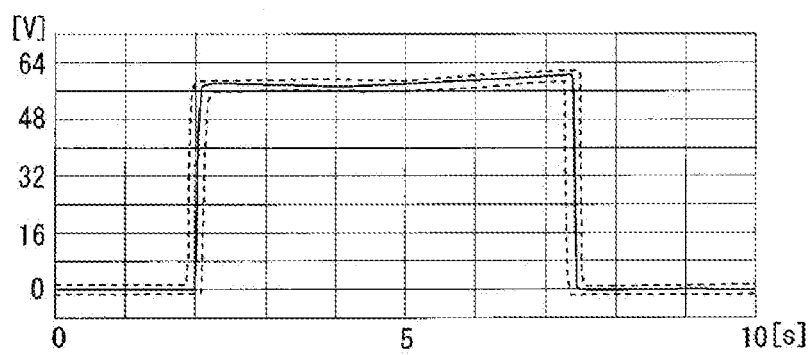
FIGS. 25(A) and 25(B) show waveforms when the coil gap d is 2.1 mm in the result of Comparison Example 3 in the second embodiment of the present invention.
Figure 25B:
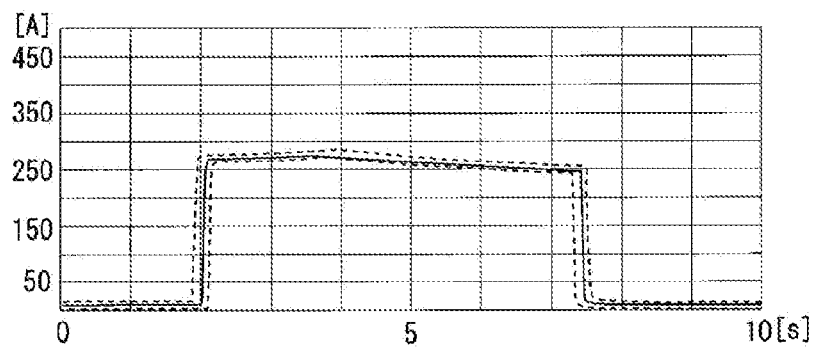

Among the results of the Comparison Example 3 in the second embodiment, FIGS. 24(A) and 24(B) show the waveform when the coil gap d is 1.5 mm. FIG. 24(A) shows the waveform of the coil voltage. FIG. 24(B) shows the waveform of the output current. Among the results of the Comparison Example 3 in the second embodiment, FIGS. 25(A) and 25(B) show the waveform when the coil gap d is 2.1 mm. FIG. 25(A) shows the waveform of the coil voltage. FIG. 25(B) shows the waveform of the output current. In the drawings, the solid lines show the respective waveforms and the dotted lines show upper limits and lower limits of the range of threshold values. As can be seen from FIGS. 24(A) and 24(B), when the coil gap d is 1.5 mm, the voltage waveform was almost at the neighborhood of the center of the upper-limit and lower-limit threshold values. However, when the coil gap d is 2.1, as can be seen from FIGS. 25(A) and 25(B), the voltage waveform was almost at the neighborhood of the center of the upper-limit and lower-limit threshold values but the current waveform was not within the range of the threshold values. Thus, the determination by the determination unit 23*d* was "fine" when the coil gap d was 1.5 mm but was "not fine" when the coil gap d was 2.1 mm. It is considered that the reason why the coil voltage $V_{coil}$ and the output current $I_o$ change in the case that an induction heating is started without changing the coil gap d is that the heating suppresses the work from being induction-heated.

As can be seen from the result of Comparison Example 3, an increase of the coil gap d of 1 mm causes a decrease of about 2% of the output current $I_o$ and an increase of about 0.7% of the coil voltage $V_{coil}$. The change rates are smaller when compared with the change rates of the load impedance of Example 4.

As described above, the comparison of Example 4 with Comparison Example 3 showed that the monitoring of the load impedance is more effective than the monitoring of the output current $I_o$ and the coil voltage $V_{coil}$. Although the above section has described a bar-like member as a work, the invention is effective as a monitoring means when a structure in which a work has a connected portion in a direction crossing an axis portion, e.g., a flange or the neighborhood of the flange, is subjected to a hardening processing. The reason is that, with an increase of the distance between a hardening target region in the work and a heating coil, a straight portion shows no change in a hardening processing but a semicircular portion shows a poor hardening processing, as shown in FIG. 13.

The following section will describe a modification example of the system shown in FIG. 1. The first modification example shows a case where the system configuration shown in FIG. 1 is changed in the relation among the hardening control unit 70, the hardening monitoring unit 20, and the data collecting unit 80. The second modification example shows a case where there are a plurality of combinations of the induction hardening apparatuses 10, the hardening monitoring units 20, and the hardening control units 70 shown in FIG. 1 and these combinations are connected to the data collecting unit 80 via a communication means such as LAN. The third modification example shows a case where the induction hardening apparatus is configured so that one high-frequency inverter 11 subjects a plurality of works to an induction hardening. In any of these modification examples, the hardening monitoring unit 20 may monitor current from the high-frequency inverter 11 and a coil voltage outputted or the hardening monitoring unit 20 also may calculate a load impedance to monitor the load impedance as described above. The following section will describe in detail the first modification example to the third modification example.

FIRST MODIFICATION EXAMPLE

Figure 26:
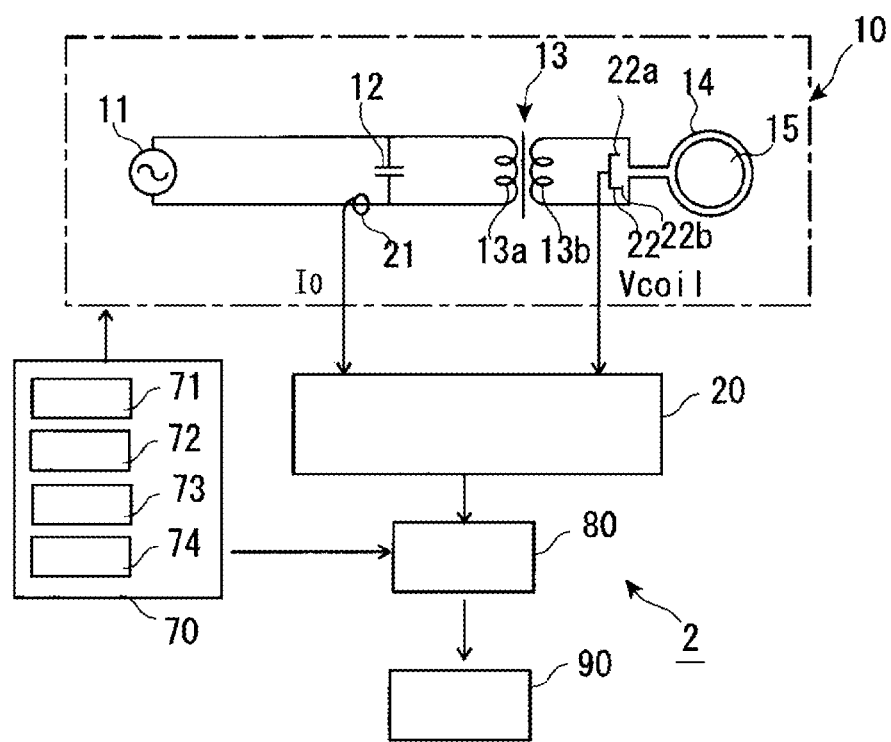
FIG. 26 is a configuration diagram of an induction hardening control system according to the first modification example different from the diagram shown in the FIG. 1.

FIG. 26 is a configuration diagram illustrating an induction hardening control system 2 of the first modification example different from the system configuration shown in FIG. 1. The induction hardening control system 2 is different from the system shown in FIG. 1 in that the data collecting unit 80 is connected to the hardening control unit 70 and the hardening monitoring unit 20 via communication means, respectively. In this case, the data collecting unit 80 collects measurement data from the hardening monitoring unit 20, collects setup conditions data from the hardening control unit 70, and collects detection data from the induction hardening apparatus 10 to store, in a database, the measurement data, the setup conditions data, and the detection data to be associated with association data such as a processing date. During this, the data collecting unit 80 may send a transmission request to the hardening monitoring unit 20, the hardening control unit 70, and the induction hardening apparatus 10, respectively or the data also may be automatically sent at a predetermined timing from the hardening monitoring unit 20, the hardening control unit 70, and the induction hardening apparatus 10, respectively. When detection data is outputted from the induction hardening apparatus 10 to the hardening control unit 70 as described above, the data collecting unit 80 collects measurement data and detection data from the hardening control unit 70.

SECOND MODIFICATION EXAMPLE

Figure 27:
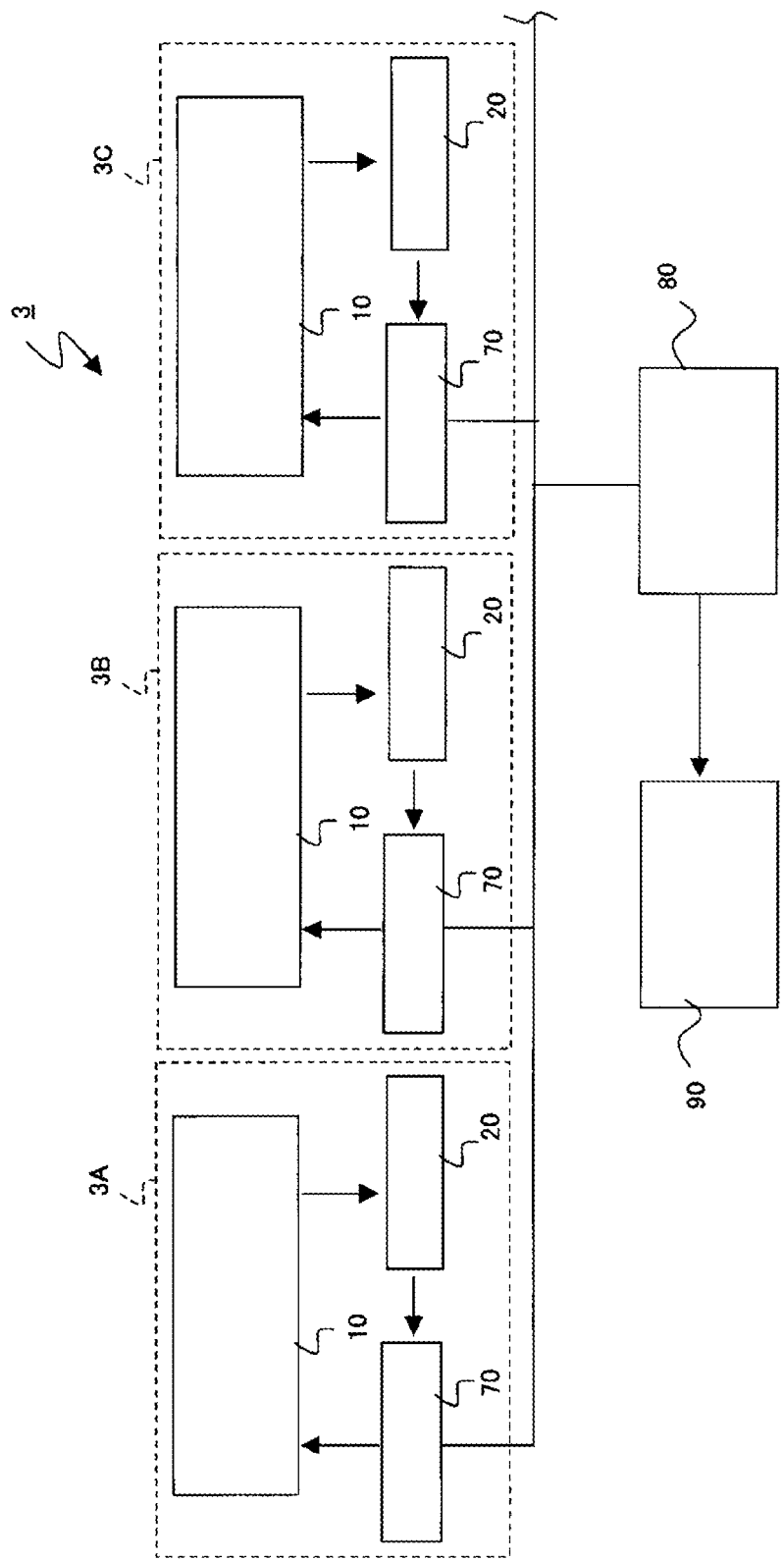
FIG. 27 is a configuration diagram of an induction hardening control system according to the second modification example different from the diagram shown in the FIG. 1.

FIG. 27 is a configuration diagram illustrating an induction hardening control system 3 according to the second modification example. The induction hardening control system 3 is configured so that there are a plurality of combinations of the induction hardening apparatus 10, the hardening monitoring unit 20, and the hardening control unit 70 so that the hardening control unit 70 in each combination and the data collecting unit 80 are connected via a communication means such as LAN. Specifically, one combination of induction hardening systems 3A, 3B, and 3C is controlled by one data collecting unit 80. In this case, the LAN connects the hardening control units 70 to one another to send the setup conditions data, measurement data, and detection data to the data collecting unit 80. In this second modification example, the data collecting unit 80 uses a sequencer control for example to request the respective hardening control units 70 to send the setup conditions data, measurement data, and detection data regarding the induction hardening processing. Upon receiving the request as described above, the hardening control unit 70 receives the measurement data via the communication means from the hardening monitoring unit 20 and sends this measurement data together with the setup conditions data and the detection data to the data collecting unit 80 via the LAN. Then, the data collecting unit 80 receives the setup conditions data, the measurement data, and the detection data from the respective hardening control units 70 and stores these pieces of data in a database so that the association thereamong can be established. Thus, these pieces of data can be subjected to a uniform control.

As described in the first modification example, another configuration also may be used in which the LAN connects the respective combinations of the hardening monitoring units 20 and the hardening control units 70, respectively, and the data collecting unit 80 stores the setup conditions data, measurement data, and detection data in a database while being associated with one another.

THIRD MODIFICATION EXAMPLE

Figure 28:
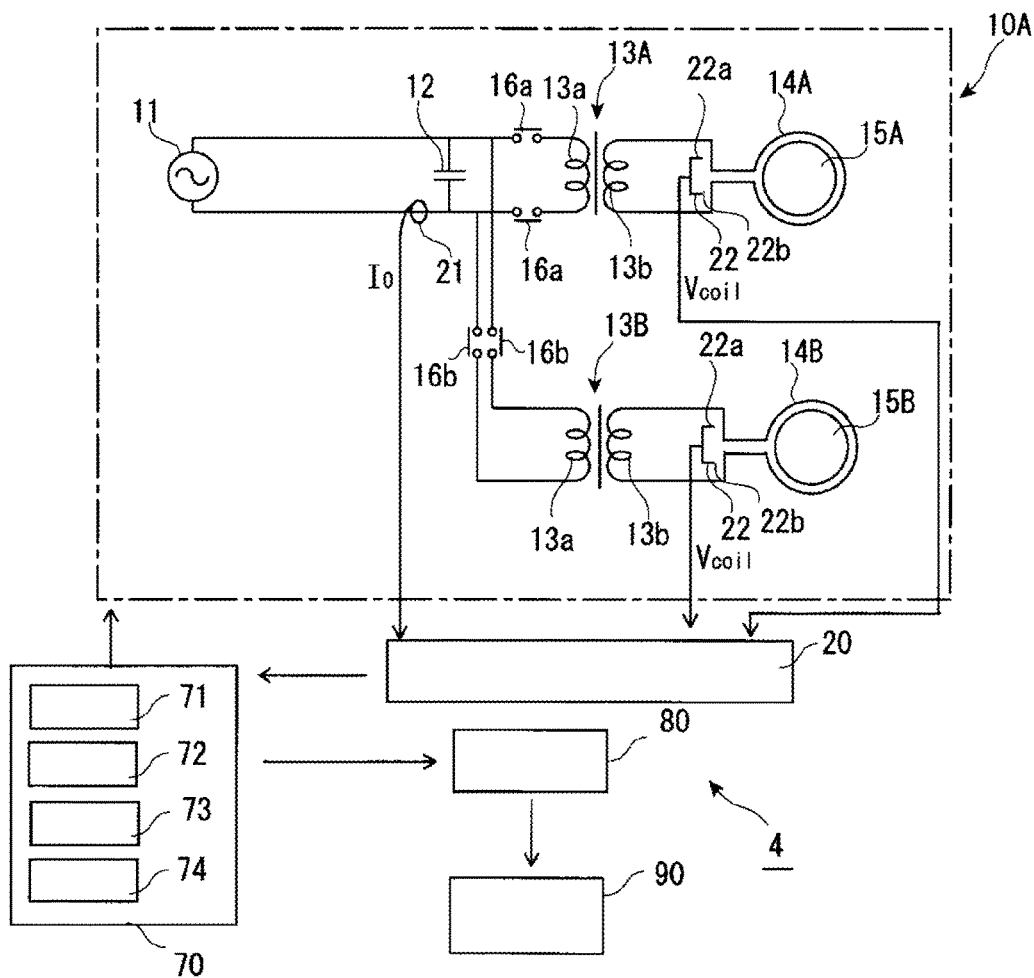
FIG. 28 is a configuration diagram of an induction hardening control system according to the third modification example different from the diagram shown in the FIG. 1.

FIG. 28 is a configuration diagram illustrating an induction hardening control system 4 according to the third modification example. The induction hardening control system 4 is different from the above-described induction hardening control systems 1, 2, and 3 in the induction hardening apparatus 10A. The induction hardening apparatus 10A has an electric circuit configuration as shown in FIG. 28 that includes: one high-frequency inverter 11; one matching capacitor 12 connected between output terminals of the high-frequency inverter 11; a plurality of heating coils 14A and 14B for subjecting works 15A and 15B to an induction heating, respectively; a plurality of current transformers 13A and 13B provided between the matching capacitor 12 and the respective heating coils 14A and 14B, respectively; and a plurality of switchers 16a and 16b provided between the primary input-side of the plurality of current transformers 13A and 13B and one matching capacitor 12, respectively. Each of the current transformers 13A and 13B is composed of the primary current-side coil 13a parallelly connected to the matching capacitor 12 with regard to the high-frequency inverter 11 and the secondary current-side coil 13b parallelly connected to the heating coils 14A and 14B, respectively. The following section will describe a case as shown in FIG. 28 in which the two heating coils 14A and 14B, the two current transformers 13A and 13B, and the two switchers 16a and 16b are provided. However, another configuration also may be used where three or more heating coils and current transformers are provided that are connected to the corresponding switchers. One heating coil 14A is serially connected to the secondary current-side coil 13b of one current transformer 13A. The primary current-side coil 13a of one current transformer 13A is parallelly connected via one switcher 16a to the matching capacitor 12. Similarly, the other heating coil 14B is serially connected to the secondary current-side coil 13b of one current transformer 13B. The primary current-side coil 13a of the other current transformer 13B is parallelly connected via the other switcher 16b to the matching capacitor 12. Thus, one work 15A can be subjected to an induction hardening processing by turning ON one switcher 16a and turning OFF the other switcher 16b. Similarly, the other work 15B can be subjected to an induction hardening processing by turning OFF one switcher 16a and turning ON the other switcher 16b. The switchers 16a and 16b are controlled by a switch control unit (not shown) for example based on setup conditions data. The example shown as the third modification example is also configured so that the induction hardening apparatus 10A has an equivalent circuit configuration in which the matching capacitor 12 and the heating coils 14A, 14B include a parallel resonance circuit.

When the induction hardening apparatus 10A subjects, as shown in FIG. 28, a plurality of works 15A and 15B to an induction heating by one high-frequency inverter 11, the hardening monitoring unit 20 includes: one current sensor 21 for detecting the output current from the high-frequency inverter 11; a plurality of voltage sensors 22A and 22B for detecting the voltages in the respective heating coils 14A and 14B; a control unit 23 for monitoring the induction hardening based on the detection signal from the current sensor 21 and the detection signals from the voltage sensors 22A and 22B; and a warning unit 24 that inputs various control information to the control unit 23 and that receives a warning signal from the control unit 23. Specifically, the hardening monitoring unit 20 has one current sensor 21 and the voltage sensors 22A and 22B provided in the same number as that of the heating coils 14A and 14B.

When the induction hardening apparatus 10A receives, as setup conditions data from the hardening control unit 70, an output control signal from the high-frequency inverter 11 and a switching control signal from the switcher 16, a high frequency wave is outputted from the high-frequency inverter 11 based on this setup conditions data and the switchers 16a and 16b are switched. One current sensor 21 is connected to a closed circuit between the high-frequency inverter 11 and the matching capacitor 12. The respective voltage sensors 22A and 22B are connected to closed circuits provided between the heating coils 14A and 14B and the secondary current-side coils 13b and 13b, respectively. Thus, the hardening monitoring unit 20 receives the detection signal from the current sensor 21 and the detection signals from the respective voltage sensors 22A and 22B. Thus, the measurement data regarding each induction hardening processing is inputted.

Thus, the induction hardening control system 3 according to the third modification example has a similar configuration in which the data collecting unit 80 obtains setup conditions data from the hardening control unit 70, obtains measurement data from the hardening monitoring unit 20 via the hardening control unit 70, and obtains detection data from the induction hardening apparatus 10A directly or via the hardening control unit 70 to store, in a database, the setup conditions data, measurement data, and detection data for each induction hardening processing with regard to the respective works 15A and 15B. Another configuration as in the first modification example also may be used in which the data collecting unit 80 directly obtains measurement data from the hardening monitoring unit 20. The data exchange other than this is the same as the above-described one and will not be described further.

In any of the induction hardening control systems 1 to 4 shown in FIG. 1 and FIG. 26 to FIG. 28, the data collecting unit 80 stores, in a database and in an integrated fashion, the setup conditions data obtained from the hardening control unit 70, the measurement data directly or indirectly obtained from the hardening monitoring unit 20, and the detection data directly or indirectly obtained from the induction hardening apparatus 10A. The following section will describe an example of a data item in the hardening control unit 70, the data collecting unit 80, and the hardening monitoring unit 20.

The hardening control unit 70 stores therein, as setup conditions data, the induction hardening processing number, an induction hardening date, an induction hardening time, the information for the position of the work at the start of the induction hardening, the work transfer speed to the heating coil, the set output value of the high-frequency inverter 11, instruction information regarding whether coolant is jetted to the work or not, or the work rotation speed for example.

The data stored in the data collecting unit 80 (i.e., detection data) obtained as a result of the setup conditions data outputted from the hardening control unit 70 to the induction hardening apparatuses 10 and 10A includes, for example, data outputted from various sensors of the induction hardening apparatuses 10 and 10A (e.g., the sensor 11a, the flow sensors 102 and 115, the temperature sensor 116, and the measuring unit 117). Various sensors also include various meters included in the induction hardening apparatuses 10 and 10A. Detection data items include, for example, the induction hardening processing number, the induction hardening date, the induction hardening time, the information regarding the position of the work at the start of the induction hardening, the output power from the high-frequency inverter 11, the hardening liquid flow, and the rotation number of the work.

Data stored in the hardening monitoring unit 20 includes: the date of the trigger for sampling the detection signal from the current sensor 21 and the voltage sensor 22; the instantaneous value and the time-series value of an effective value of the current sensor 21 and the voltage sensor 22; and the determination result by the determination unit 23d for example. If an impedance is calculated by the signal processing unit 23c, data stored in the hardening monitoring unit 20 also includes an impedance instantaneous value, a time-series value, and the determination result by the determination unit 23d based on the impedance for example.

Thus, the data editing unit 90 collects the data stored in the hardening control unit 70, the data collecting unit 80, and the hardening monitoring unit 20 so that the data for example can be confirmed by a user through spreadsheet software for example. This data is edited by a user so that the user can organize and confirm, with regard to each induction hardening processing, the induction hardening time, the position of the work at the start of the induction hardening, the high frequency wave power, the hardening liquid flow, and the work rotation number. Alternatively, the induction hardening quality for each induction hardening processing also can be controlled by setting conditions for an allowable range with regard to the respective data items except for the induction hardening processing number.

As described above, the data collecting unit 80 stores, in a database, the setup conditions data regarding an induction hardening processing of a certain work, the measurement data of the electric quantity in an electric circuit configured between the high-frequency inverter 11 and the heating coil 14, and various pieces of detection data (e.g., the flow data for the coolant for the heating coil 14, the hardening liquid flow data, temperature data, cooling power data) for example. Furthermore, the setup conditions data, measurement data, and detection data are stored while being associated with one another with regard to each induction hardening processing. Thus, the data stored in the data collecting unit 80 can be read so that the induction hardening conditions and various statuses during an actual induction hardening can be associated to each other with regard to each work, thus providing a comprehensive control to the induction hardening.

The present invention can be changed within a scope not deviating from the scope of the invention. For example, the data editing unit 90 also may store, in a database, the setup conditions data stored in the hardening control unit 70 and the measurement data measured by the hardening monitoring unit 20 so that these pieces of data are associated to each other.

The configurations of the electric circuits in the induction hardening apparatuses 10 and 10A shown in FIG. 1 and FIG. 28 may be changed arbitrarily. Various sensors provided in the induction hardening apparatuses 10 and 10A also may be the ones other than the one shown in FIG. 2 for example.

What is claimed is:

1. An induction hardening control system that is connected to an induction hardening apparatus configured so that a high-frequency inverter is connected to a capacitor and a heating coil and that controls an induction hardening to a work placed in the vicinity of the heating coil, comprising:
   a hardening control unit that controls the induction hardening apparatus based on setup conditions data regarding the induction hardening apparatus;
   a hardening monitoring unit that measures, as measurement data, an electric quantity in an electric circuit configured to include the high-frequency inverter, the capacitor, and the heating coil to monitor an induction hardening status; and
   a data collecting unit that collects data from various sensors in the induction hardening apparatus obtained when the work is subjected to the induction hardening by the induction hardening apparatus based on the setup conditions data outputted from the hardening control unit and that collects the measurement data from the hardening monitoring unit to store the data collected from the various sensors and the measurement data so that the data collected from the various sensors and the measurement data are associated to each other,
   wherein the induction hardening apparatus has a current transformer which has a primary coil and a secondary coil, the primary coil being connected to the high frequency inverter via the capacitor, the secondary coil being connected to the heating coil,
   wherein the hardening monitoring unit measures an output current from the high-frequency inverter or a voltage at the heating coil as the measurement data, the output current measured by a current sensor electrically connected to a wire between the high-frequency inverter and the capacitor, the voltage measured by a voltage sensor connected to the heating coil,
   wherein the hardening monitoring unit further comprises a signal processing unit that rectifies the output current and the voltage to calculate a first effective value and a second effective value and removes noises by filters and a determination unit that determines whether the calculated first effective value and the calculated second effective value are within predetermined threshold values, and
   wherein the setup conditions data is data for setting an output intensity and an output time from the high-frequency inverter in the induction hardening apparatus.

2. The induction hardening control system according to claim 1, wherein the measurement data includes a load impedance calculated based on the output current from the high-frequency inverter and the voltage generated in the heating coil.

3. The induction hardening control system according to claim 1, wherein the hardening monitoring unit calculates the first effective value based on the output current from the high-frequency inverter and calculates the second effective value based on the voltage generated in the heating coil to thereby monitor an induction hardening processing based on the respective calculated first and second effective values.

4. The induction hardening control system according to claim 1, wherein the hardening monitoring unit calculates the first effective value based on the output current from the high-frequency inverter and calculates the second effective value based on the voltage generated in the heating coil to thereby calculate a load impedance based on the respective calculated first and second effective values.

5. The induction hardening control system according to claim 1, wherein the hardening monitoring unit and the hardening control unit are mutually connected via a communication means.

6. The induction hardening control system according to claim 1, wherein the data collecting unit is connected to the hardening monitoring unit and/or the hardening control unit via a communication means.

7. The induction hardening control system according to claim 1,
   wherein the induction hardening apparatus is configured to heat the work by high frequency current from the high-frequency inverter to the heating coil and cool the work by jetting hardening liquid, and
   wherein the data collecting unit that collects at least one of data representing temperature, flow, cooling power, and concentration of the hardening liquid when the work is subjected to the induction hardening by the induction hardening apparatus based on the setup conditions data.

8. The induction hardening control system according to claim 1,
   wherein the hardening monitoring unit measures output current from the high-frequency inverter and voltage at the heating coil as the measurement data,
   the output current measured by a current sensor electrically connected to a wire between the high-frequency inverter and the capacitor, the voltage measured by a voltage sensor connected to the heating coil.

9. The induction hardening control system according to claim 1, wherein the hardening monitoring unit further comprises a display unit.

10. The induction hardening control system according to claim 9, wherein the display unit displays the first effective value, the second effective value, and the predetermined threshold values.

11. The induction hardening control system according to claim 9, wherein the display unit displays a load impedance calculated based on the output current from the high-frequency inverter and the voltage generated in the heating coil, and upper-limit and lower-limit threshold values of the load impedance that are set in advance.

12. The induction hardening control system according to claim 1, wherein the hardening monitoring unit further comprises a warning unit, which receives a warning signal from the determination unit.

13. The induction hardening control system according to claim 12, wherein the warning unit performs a warning display based on the warning signal from the determination unit, generates warning sound to the outside, or instructs a controller of the high-frequency inverter to stop the output of high-frequency power.

\* \* \* \* \*